(12) United States Patent
Okubo

(10) Patent No.: US 8,988,782 B2
(45) Date of Patent: Mar. 24, 2015

(54) ZOOM LENS AND IMAGE PICKUP APPARATUS INCLUDING THE SAME

(71) Applicant: Canon Kabushiki Kaisha, Tokyo (JP)

(72) Inventor: Yosuke Okubo, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/949,036

(22) Filed: Jul. 23, 2013

(65) Prior Publication Data

US 2014/0029101 A1    Jan. 30, 2014

(30) Foreign Application Priority Data

Jul. 26, 2012   (JP) .................... 2012-165634

(51) Int. Cl.
  *G02B 15/14*   (2006.01)
  *G02B 15/16*   (2006.01)
  *G02B 15/177*  (2006.01)
  *G02B 27/64*   (2006.01)

(52) U.S. Cl.
  CPC .............. *G02B 15/14* (2013.01); *G02B 27/646* (2013.01); *G02B 15/16* (2013.01); *G02B 15/177* (2013.01)
  USPC ............ 359/682; 359/686; 359/684; 359/557

(58) Field of Classification Search
  CPC ....... G02B 15/14; G02B 15/16; G02B 15/177
  USPC .......................... 359/676, 686, 684, 682, 557
  See application file for complete search history.

(56) References Cited

U.S. PATENT DOCUMENTS

2010/0172030 A1* 7/2010 Yamano ........................ 359/686
2012/0013994 A1* 1/2012 Tashiro ......................... 359/686

FOREIGN PATENT DOCUMENTS

JP   2009058873 A   3/2009
JP   2010181787 A   8/2010

* cited by examiner

*Primary Examiner* — Thomas K Pham
*Assistant Examiner* — Mitchell Oestreich
(74) *Attorney, Agent, or Firm* — Canon USA Inc. IP Division

(57) ABSTRACT

A zoom lens includes, in order from an object side to an image side, first to fourth lens units having negative, positive, negative, and positive refractive power, respectively. Each lens unit moves during zooming so that a distance between the first lens unit and the second lens unit at the telephoto end is shorter than at the wide-angle end and a distance between the second lens unit and the third lens unit and a distance between the third lens unit and the fourth lens unit at the telephoto end are larger than those at the wide-angle end. A focal length of the third and fourth lens units, a focal length of the entire zoom lens at the wide-angle end, a focal length of the entire zoom lens at the telephoto end, and a sum of axial thicknesses of the first to fourth lens units are appropriately set.

11 Claims, 29 Drawing Sheets

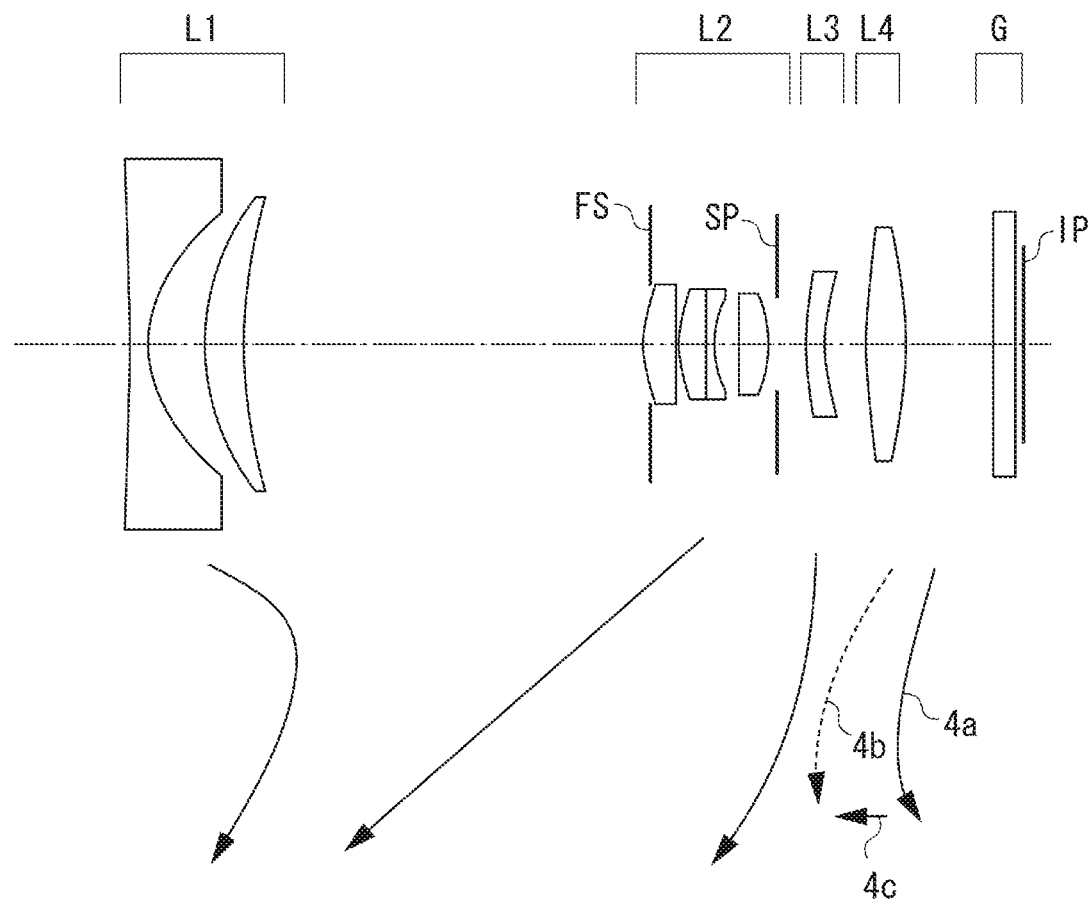

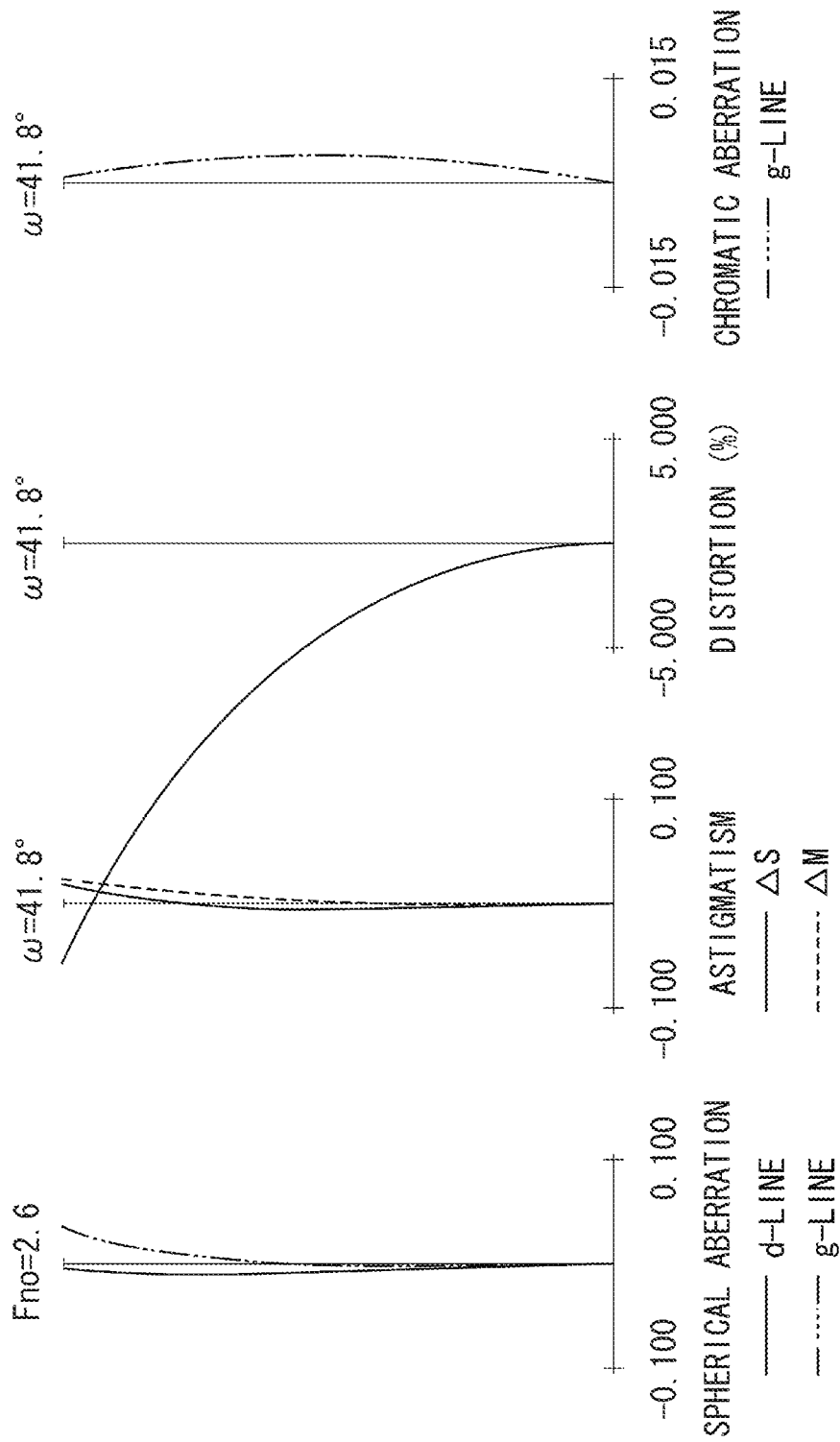

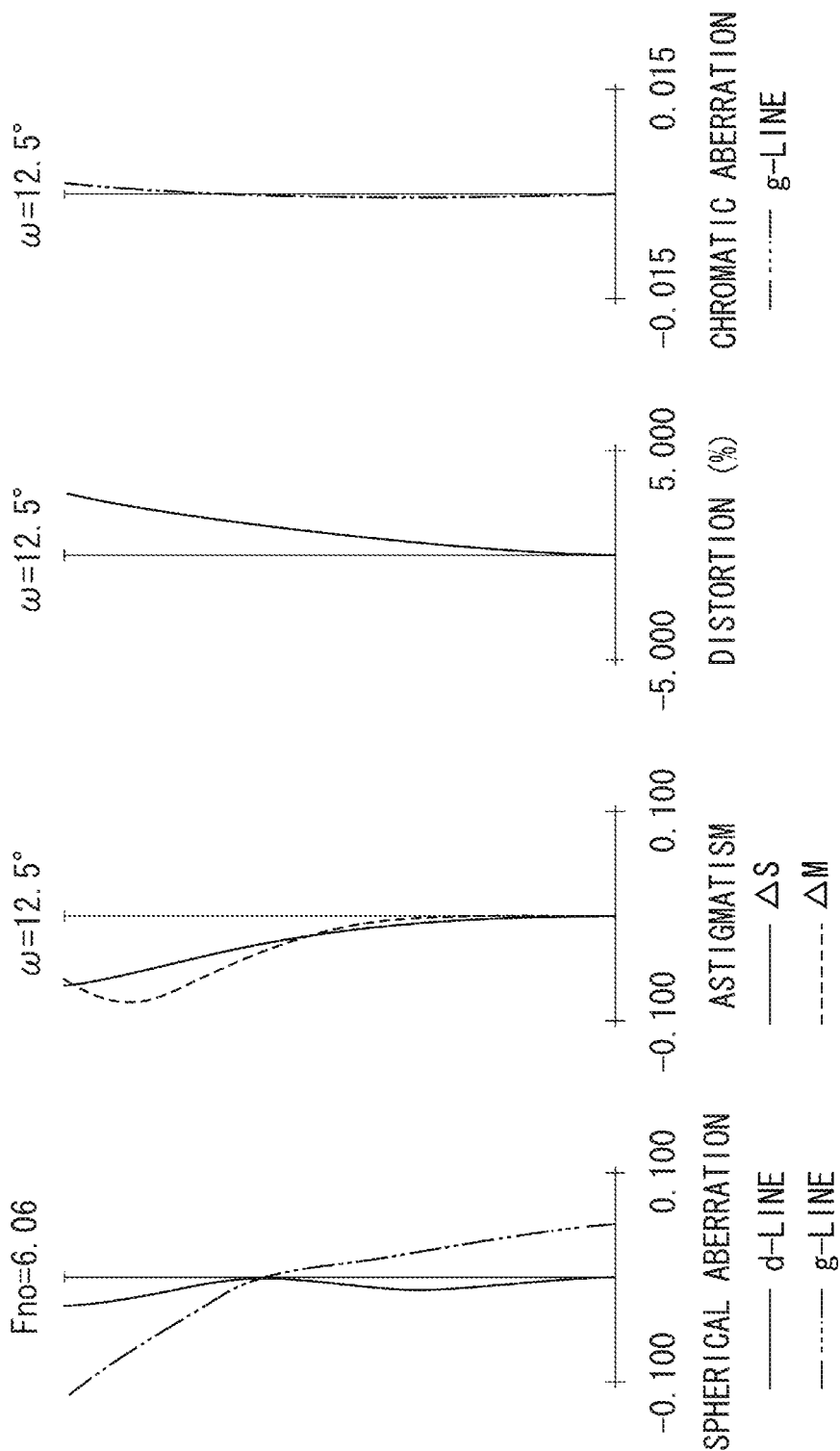

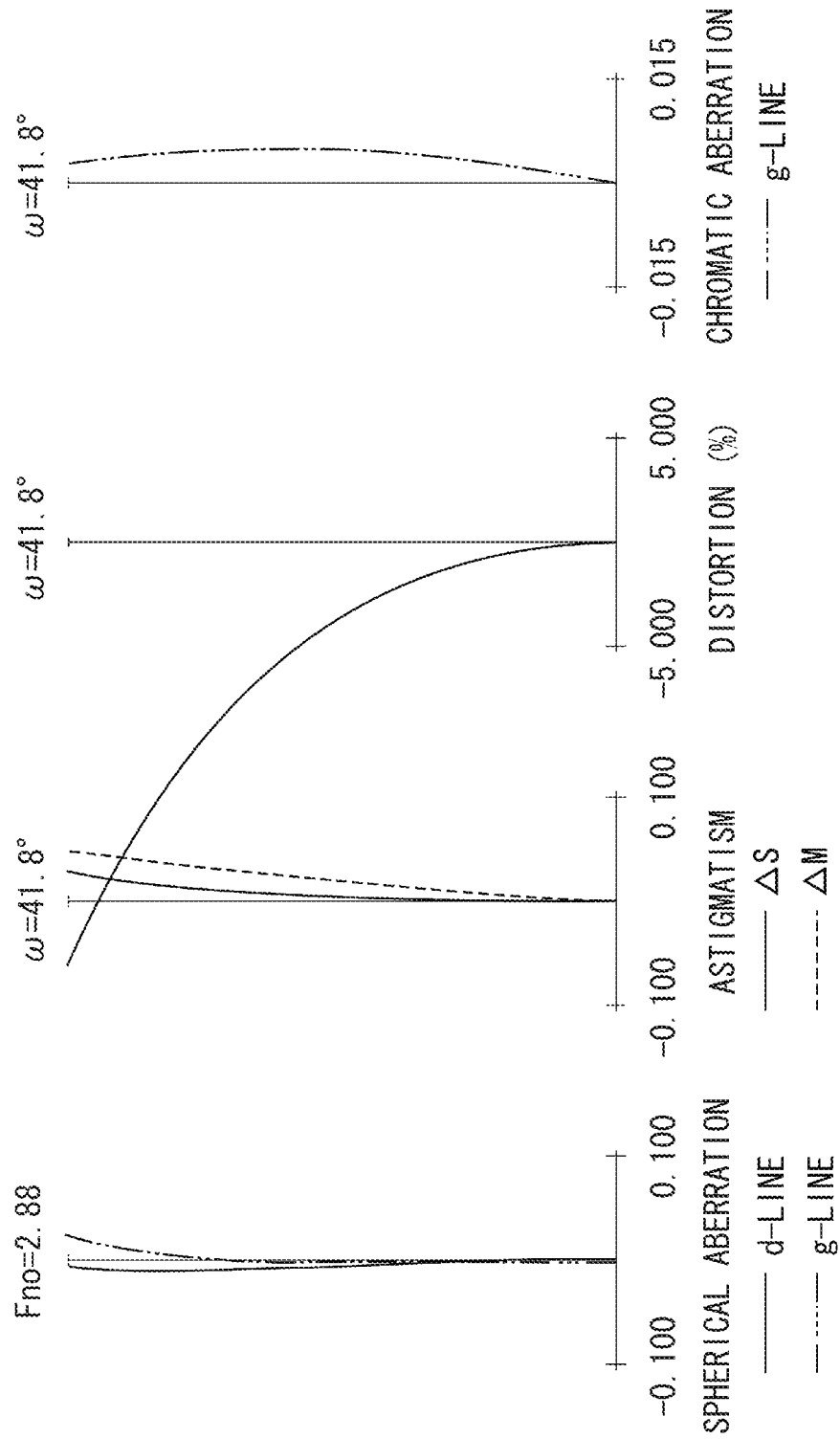

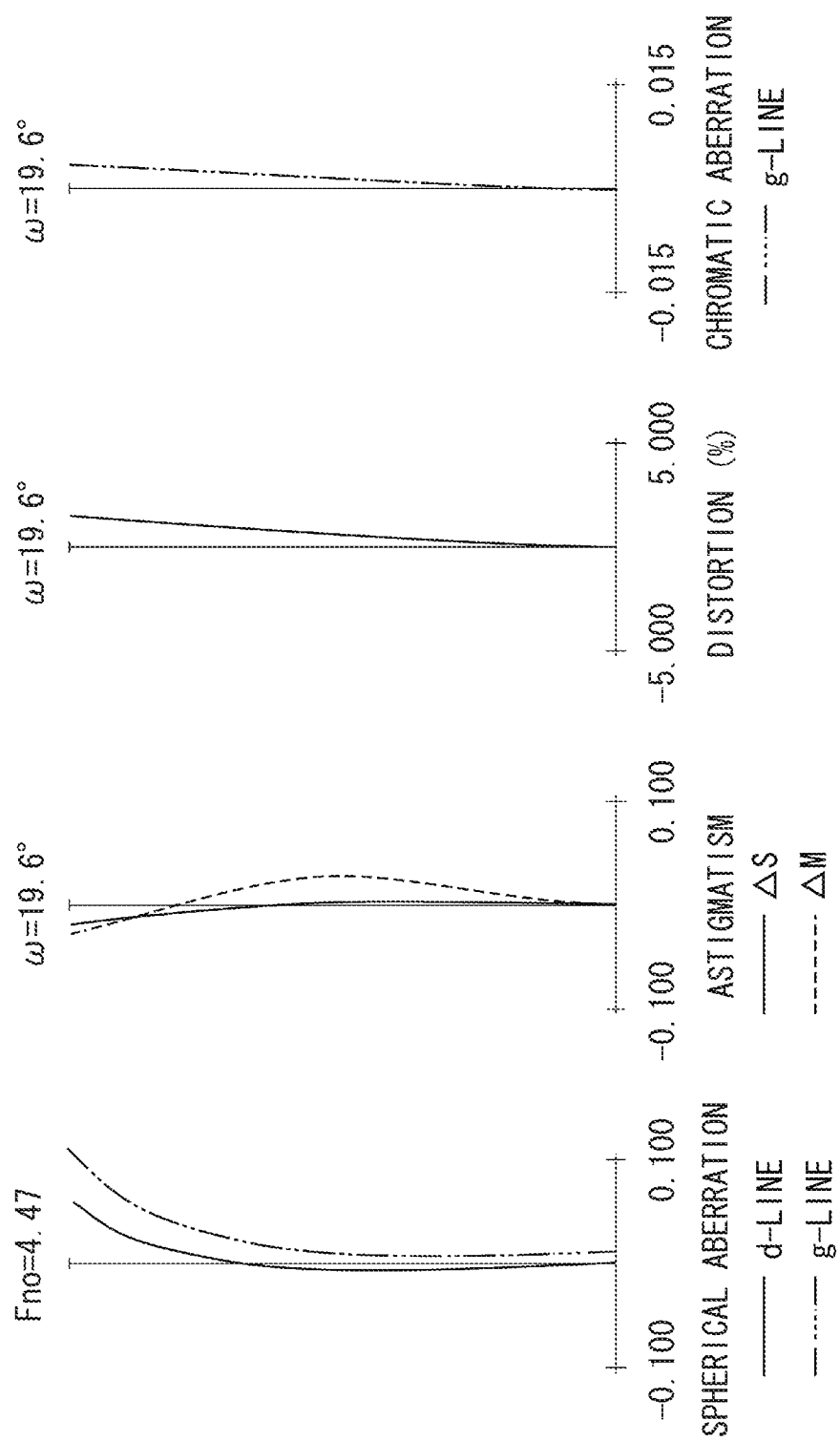

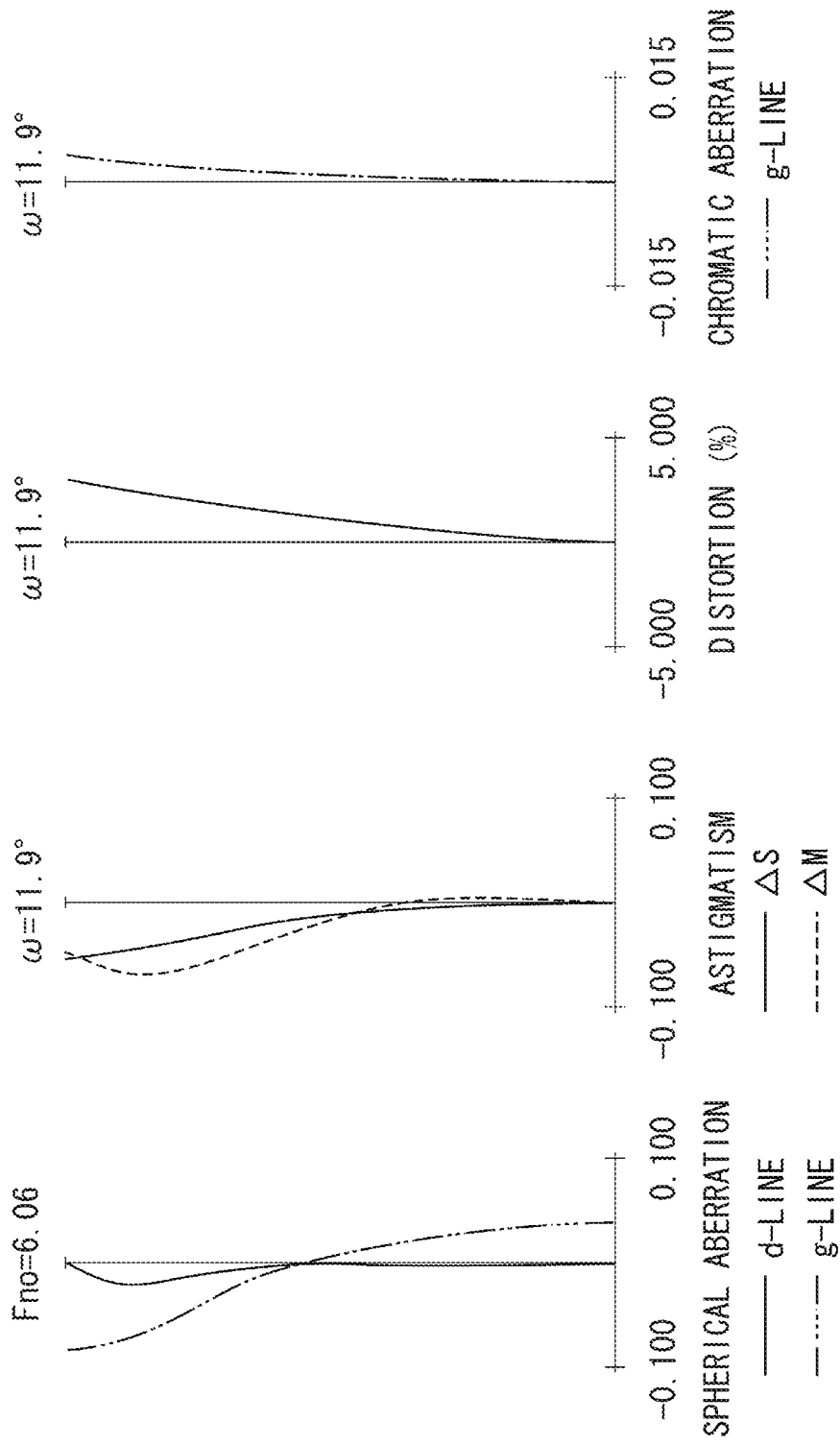

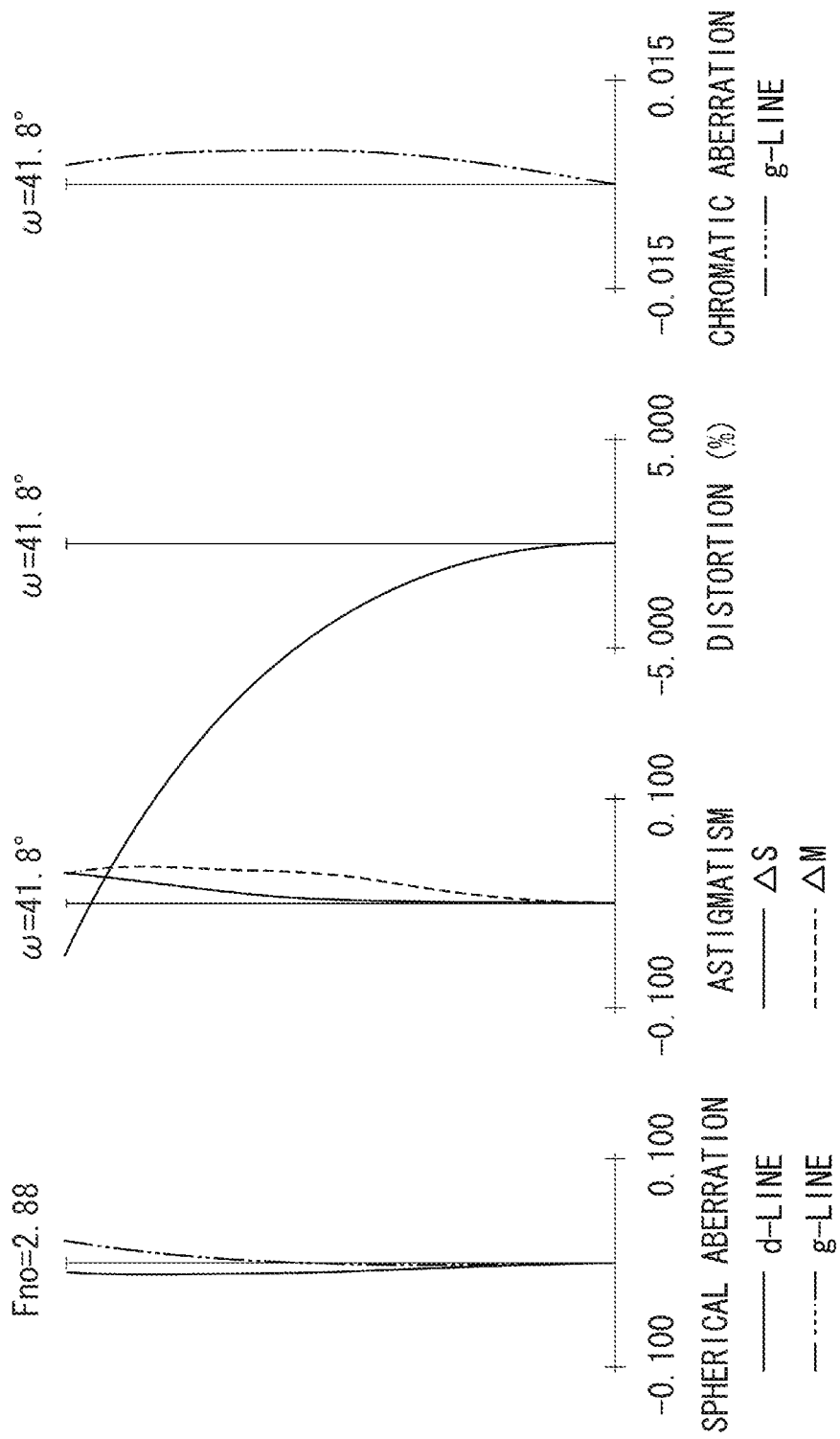

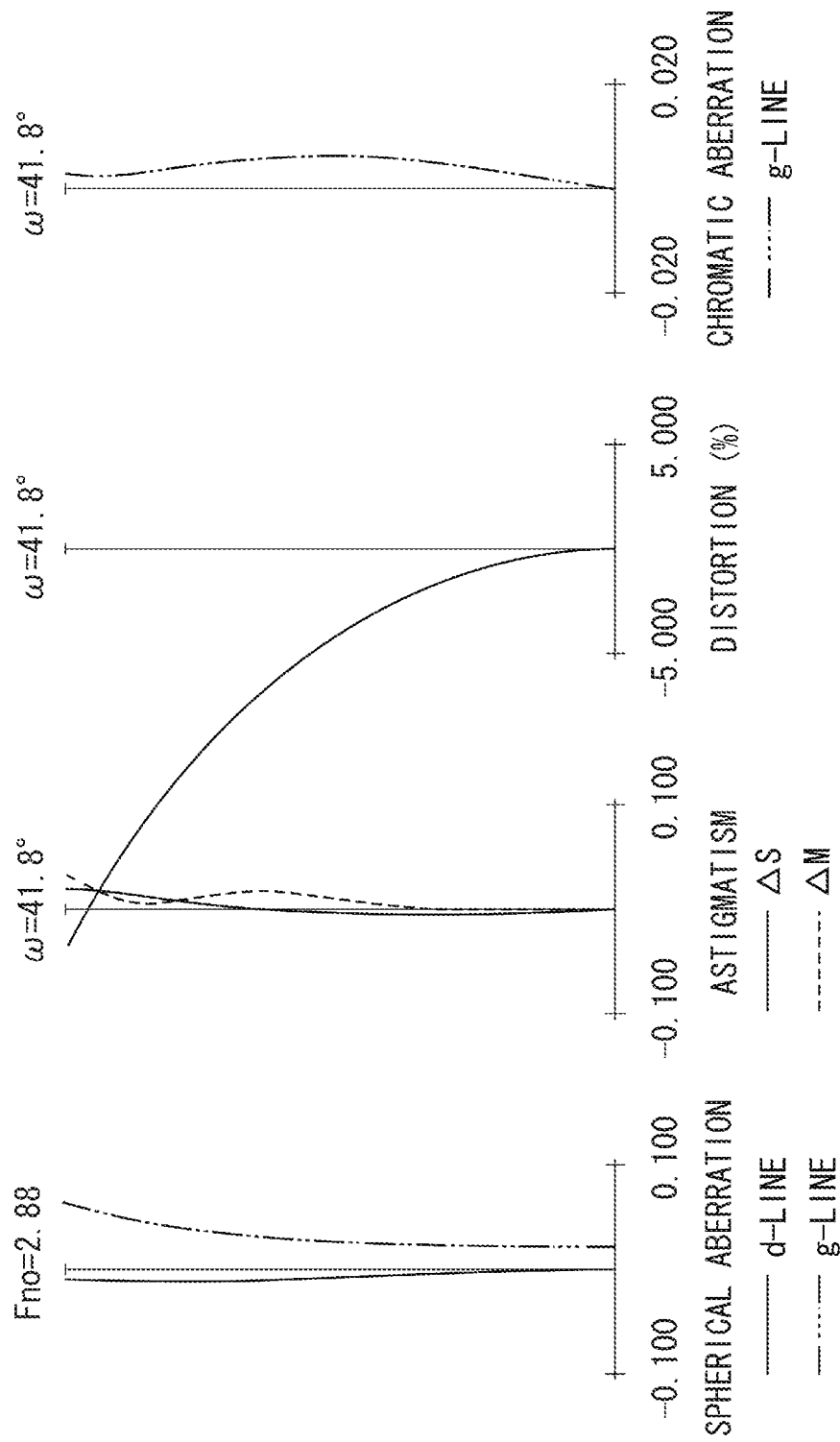

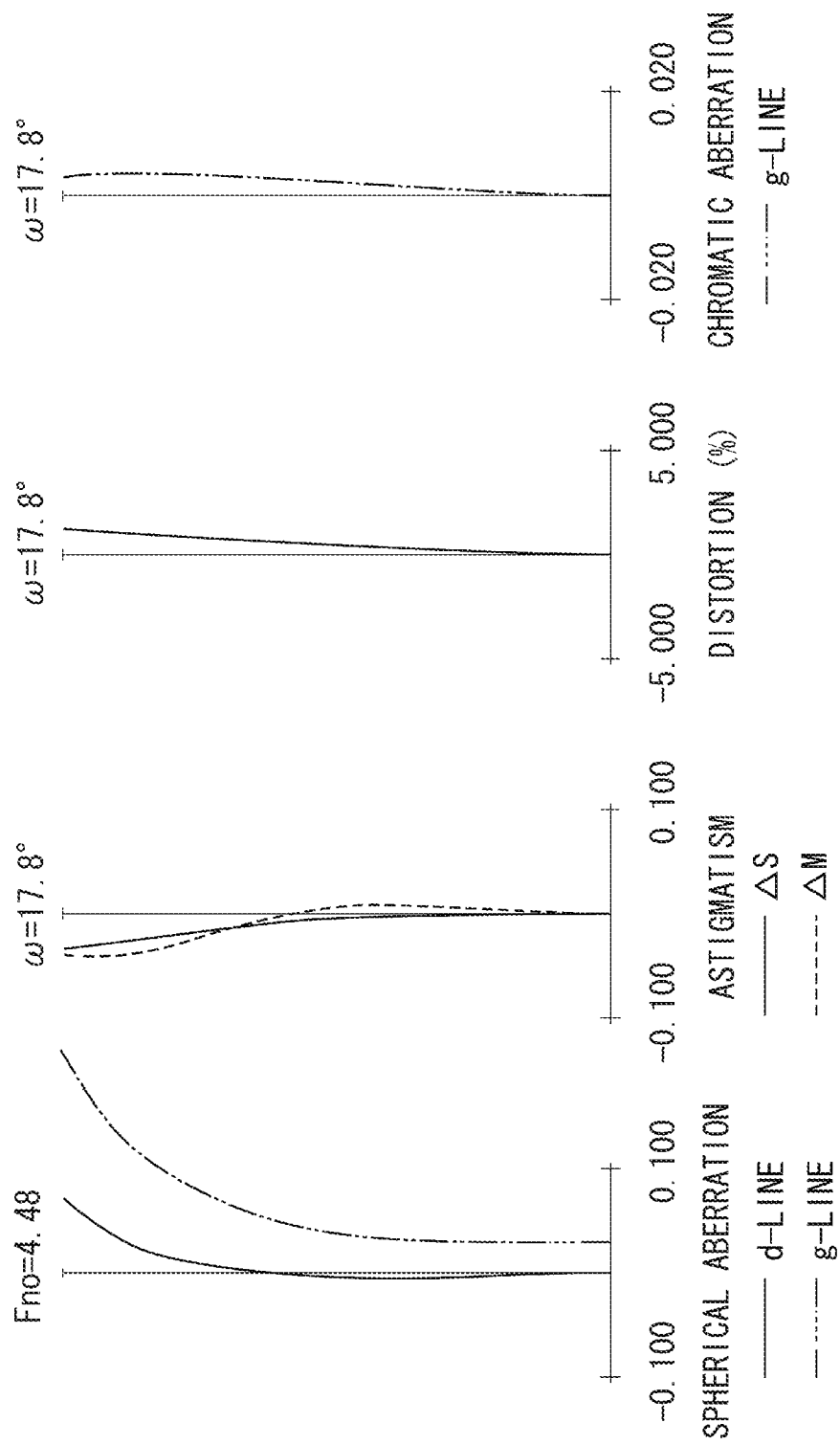

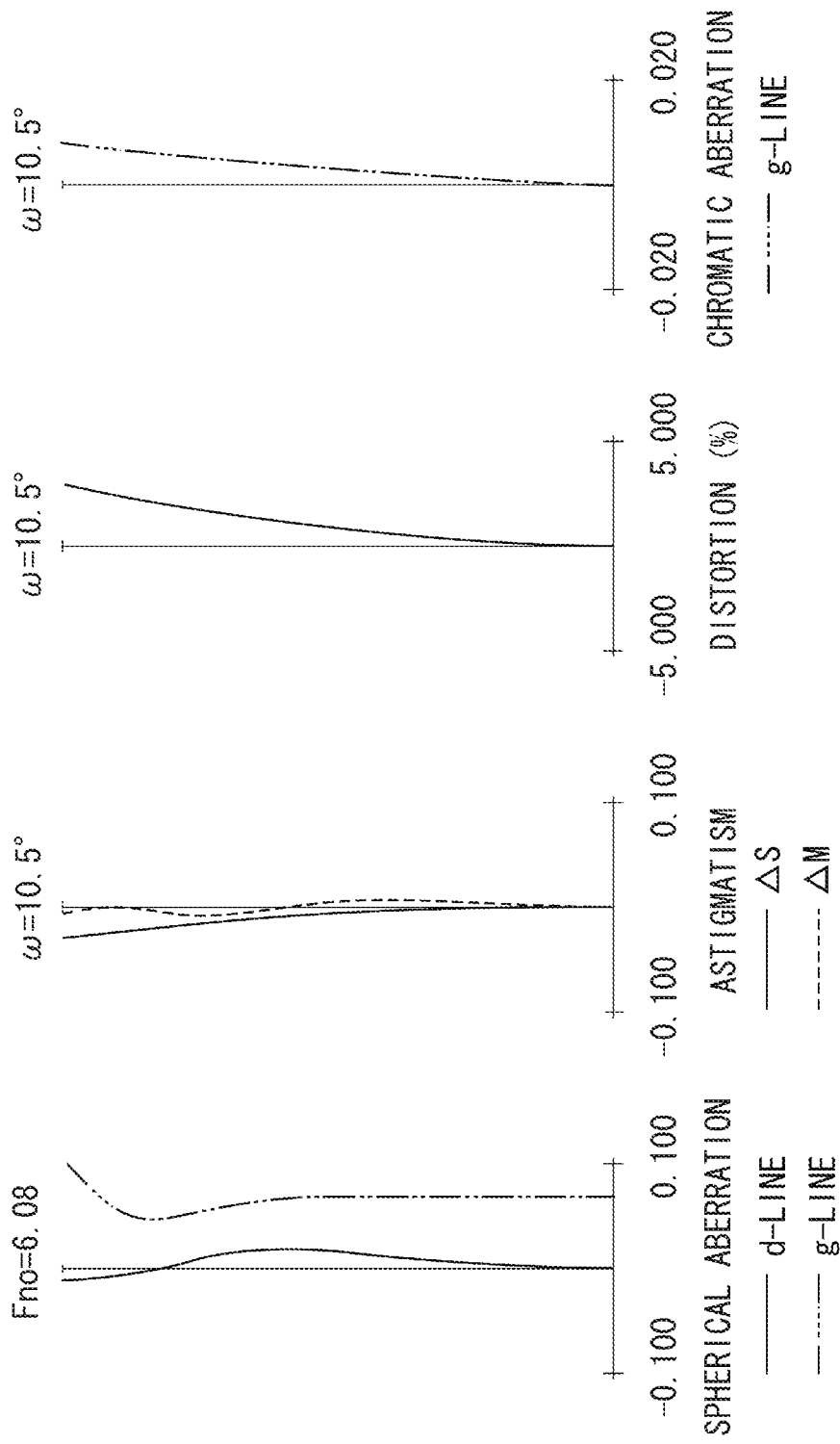

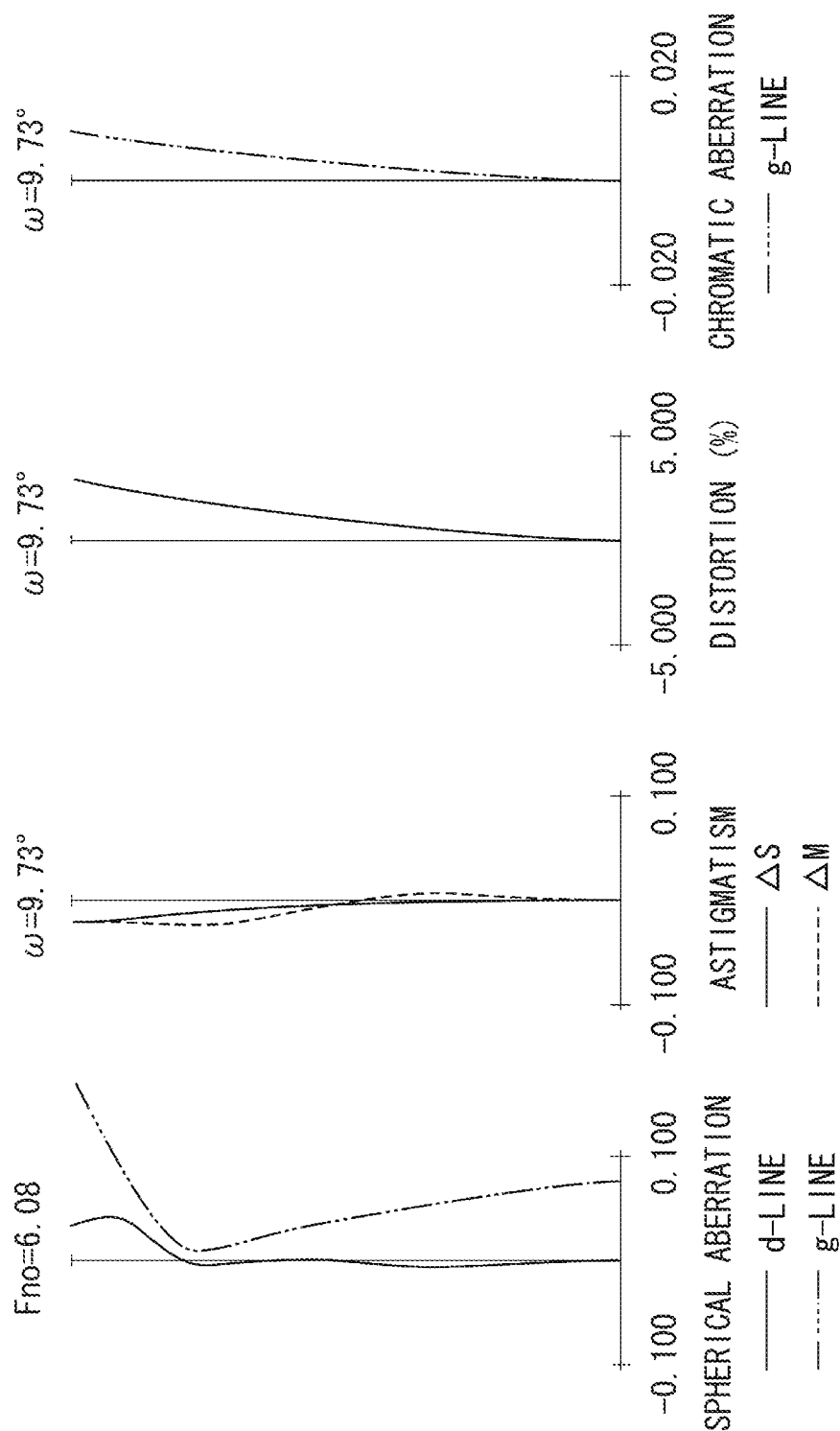

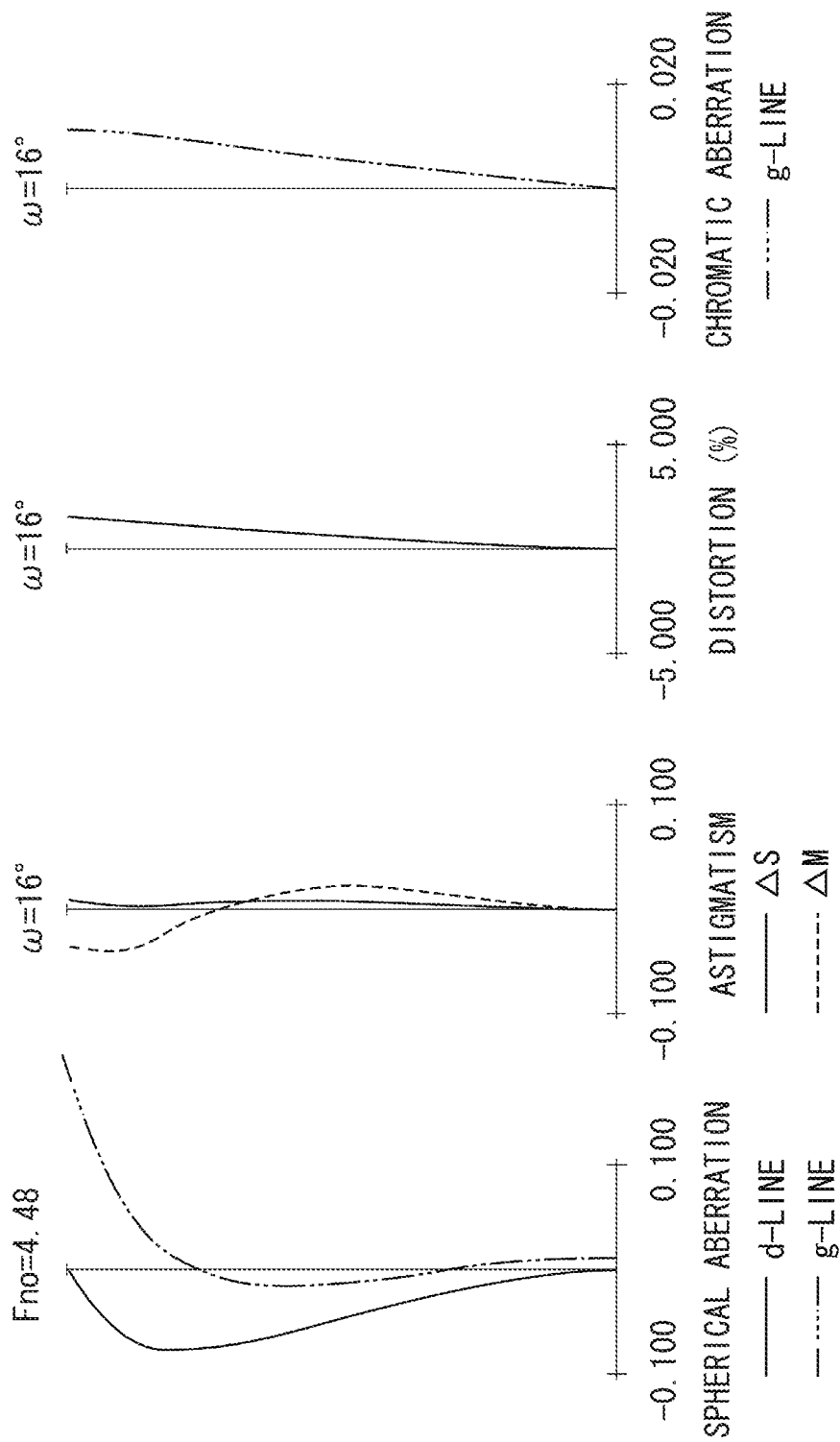

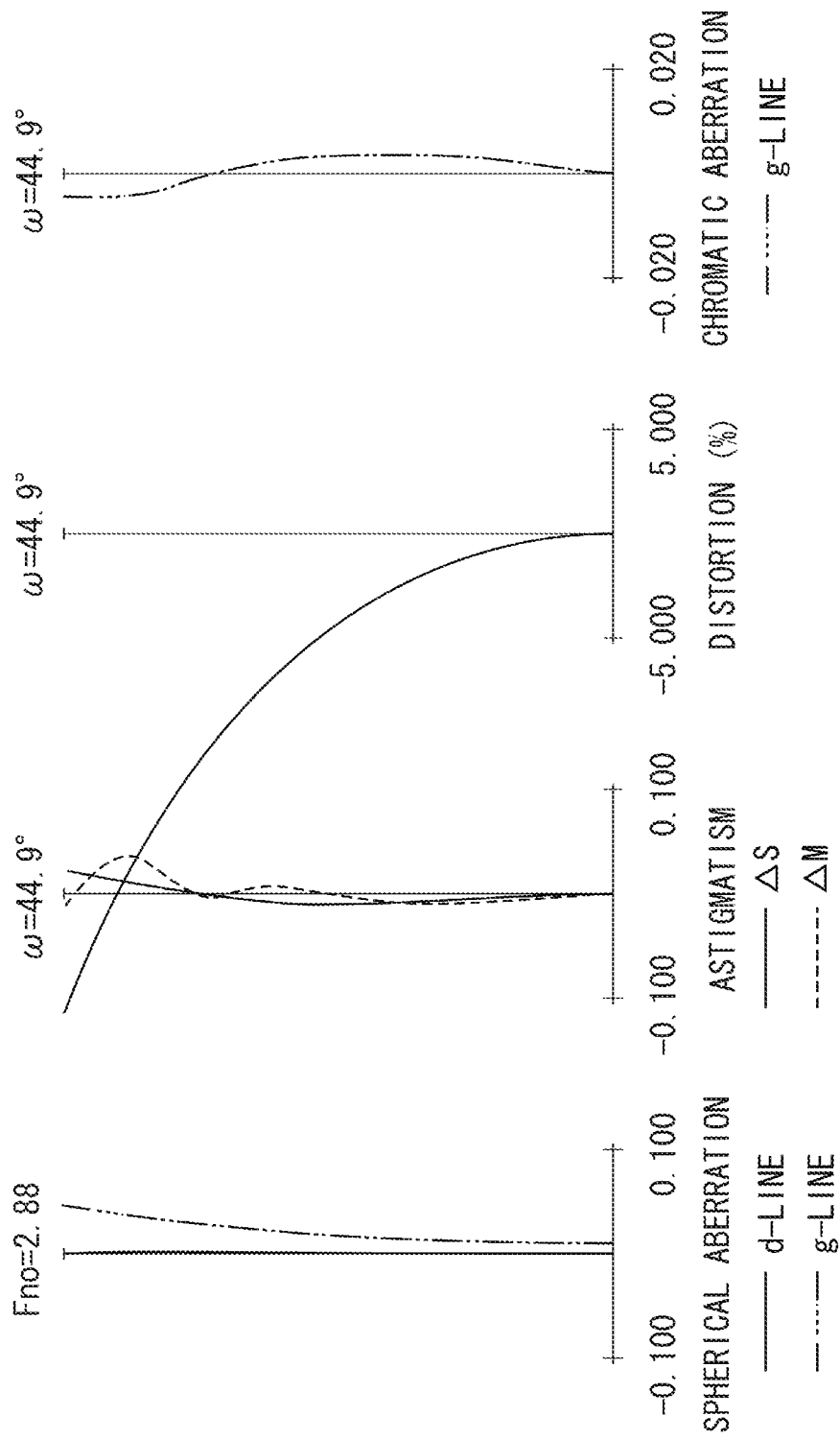

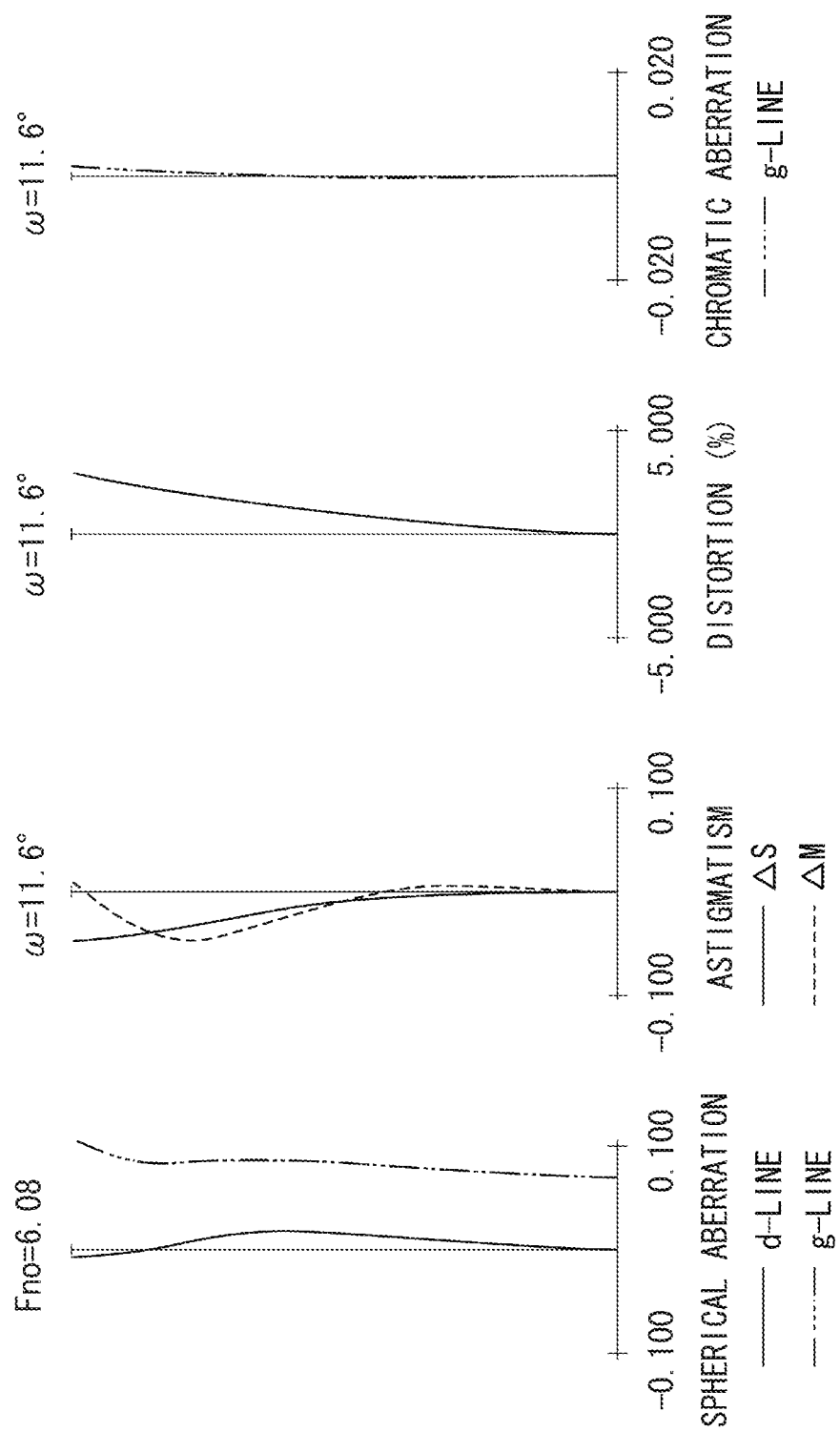

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including a zoom lens. The zoom lens may be particularly suitable to an image pickup apparatus using a solid-state image sensor, such as an electronic still camera, a video camera, a broadcast camera, and a monitoring camera, or an image pickup apparatus such as a camera using a silver-halide photographic film.

2. Description of the Related Art

Recently, an image pickup apparatus using a solid-state image sensor, such as a digital still camera and a video camera, has been miniaturized and as a result its functionality tends to be negatively affected. In particular, a zoom lens for use in the image pickup apparatus is required to be small-sized and while maintaining a high degree of functionality. For example, the small-sized zoom lens is required to have a wide angle of view and high zoom ratios.

As a zoom lens satisfying the above requirements, there is known a negative lead type zoom lens, in which a lens unit located closest to the object side has negative refractive power. The negative lead type zoom lens enables a front lens diameter to be decreased relatively easily and is advantageous to miniaturization in the direction of an optical axis.

It is desirable that the zoom lens for use in an image pickup apparatus having a solid-state image sensor is telecentric at the image side. The reason for this is that making a ray incident on the image sensor as parallel as possible to an optical axis can provide uniform image plane illuminance. As a zoom lens satisfying such a requirement, there is known a zoom lens in which a lens unit located closest to the image side has positive refractive power.

Japanese Patent Application Laid-Open Nos. 2009-058873 and 2010-181787 discuss a negative lead type zoom lens in which a lens unit located closest to the image side has positive refractive power. Specifically, a four-unit zoom lens including four lens units having negative, positive, negative, and positive refractive power, respectively, in order from an object side to an image side is discussed.

In general, to obtain a zoom lens that has a high zoom ratio and that is small-sized, refractive power (optical power=reciprocal of a focal length) of each lens unit constituting the zoom lens has to be strengthened while the number of lenses has to be reduced. However, in such a zoom lens, aberration variation caused by zooming is significant, and it is difficult to obtain high optical performance over the entire zoom range.

In general, a negative lead type zoom lens is advantageous for widening the angle of view. As a negative lead type zoom lens, Japanese Patent Application Laid-Open No. 2009-058873 discusses a zoom lens in which a focal length as converted to a 35 mm silver-halide camera measurement is 35.0 mm while a zoom ratio is about 3. Also, Japanese Patent Application Laid-Open No. 2010-181787 discusses a zoom lens in which a focal length as converted to a 35 mm silver-halide camera measurement is 25.5 mm while a zoom ratio is about 6.7. However, these zoom lenses do not simultaneously satisfy the requirements of a wide angle of view, a small size, and a high zoom ratio at the same time.

To obtain a high zoom ratio, a small size, and good optical performance in a negative lead type zoom lens, it is important to appropriately set refractive power and a lens configuration of each lens unit. It is especially important to appropriately set refractive power of a third lens unit and a fourth lens unit and the sum of axial thicknesses of lens units.

SUMMARY OF THE INVENTION

According to an aspect of the present invention, a zoom lens includes, in order from an object side to an image side, a first lens unit having negative refractive power, a second lens unit having positive refractive power, a third lens unit having negative refractive power, and a fourth lens unit having positive refractive power. Each lens unit moves during zooming so that a distance between the first lens unit and the second lens unit at a telephoto end is shorter than that at a wide-angle end, and a distance between the second lens unit and the third lens unit and a distance between the third lens unit and the fourth lens unit at the telephoto end are larger than those at the wide-angle end. When a focal length of the third lens unit is denoted by f3, a focal length of the fourth lens unit is denoted by f4, a focal length of the entire zoom lens at the wide-angle end is denoted by fw, a focal length of the entire zoom lens at the telephoto end is denoted by ft, and a sum of thicknesses of the first to fourth lens units along an optical axis of the zoom lens is denoted by Tsum, the following conditions are satisfied:

$$6.50 < |f3|/fw < 35.00$$

$$0.78 < f4/ft < 5.00$$

$$0.30 < Tsum/ft < 0.73.$$

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to a first exemplary embodiment at a wide-angle end.

FIGS. 2A, 2B, and 2C are aberration diagrams of the zoom lens according to the first exemplary embodiment at the wide-angle end, at a middle zoom position, and at a telephoto end, respectively.

FIGS. 4A, 4B, and 4C are aberration diagrams of the zoom lens according to the second exemplary embodiment at the wide-angle end, at the middle zoom position, and at the telephoto end, respectively.

FIGS. 6A, 6B, and 6C are aberration diagrams of the zoom lens according to the third exemplary embodiment at the wide-angle end, at the middle zoom position, and at the telephoto end, respectively.

FIGS. 8A, 8B, and 8C are aberration diagrams of the zoom lens according to the fourth exemplary embodiment at the wide-angle end, at the middle zoom position, and at the telephoto end, respectively.

FIGS. 10A, 10B, and 10C are aberration diagrams of the zoom lens according to the fifth exemplary embodiment at the wide-angle end, at the middle zoom position, and at the telephoto end, respectively.

FIGS. 12A, 12B, and 12C are aberration diagrams of the zoom lens according to the sixth exemplary embodiment at the wide-angle end, at the middle zoom position, and at the telephoto end, respectively.

FIGS. 14A, 14B, and 14C are aberration diagrams of the zoom lens according to the seventh exemplary embodiment at the wide-angle end, at the middle zoom position, and at the telephoto end, respectively.

DESCRIPTION OF THE EMBODIMENTS

Hereinafter, a zoom lens according to an exemplary embodiment of the present invention and an image pickup apparatus including the same will be described. A zoom lens according to an exemplary embodiment of the present invention includes, in order from an object side to an image side, a first lens unit having negative refractive power, a second lens unit having positive refractive power, a third lens unit having negative refractive power, and a fourth lens unit having positive refractive power. During zooming from a wide-angle end to a telephoto end, distances between the respective lens units change. The first lens unit has at least one negative lens and at least one positive lens.

Specifically, at the telephoto end, a distance between the first lens unit and the second lens unit is decreased, and a distance between the second lens unit and the third lens unit and a distance between the third lens unit and the fourth lens unit are increased as compared with those at the wide-angle end. Also, during zooming, each lens unit moves. The first lens unit moves along a locus convex toward the image side, and the second lens unit moves toward the object side. The third lens unit moves along a locus convex toward the image side, and the fourth lens unit moves along a locus convex toward the object side.

Figure 2B:
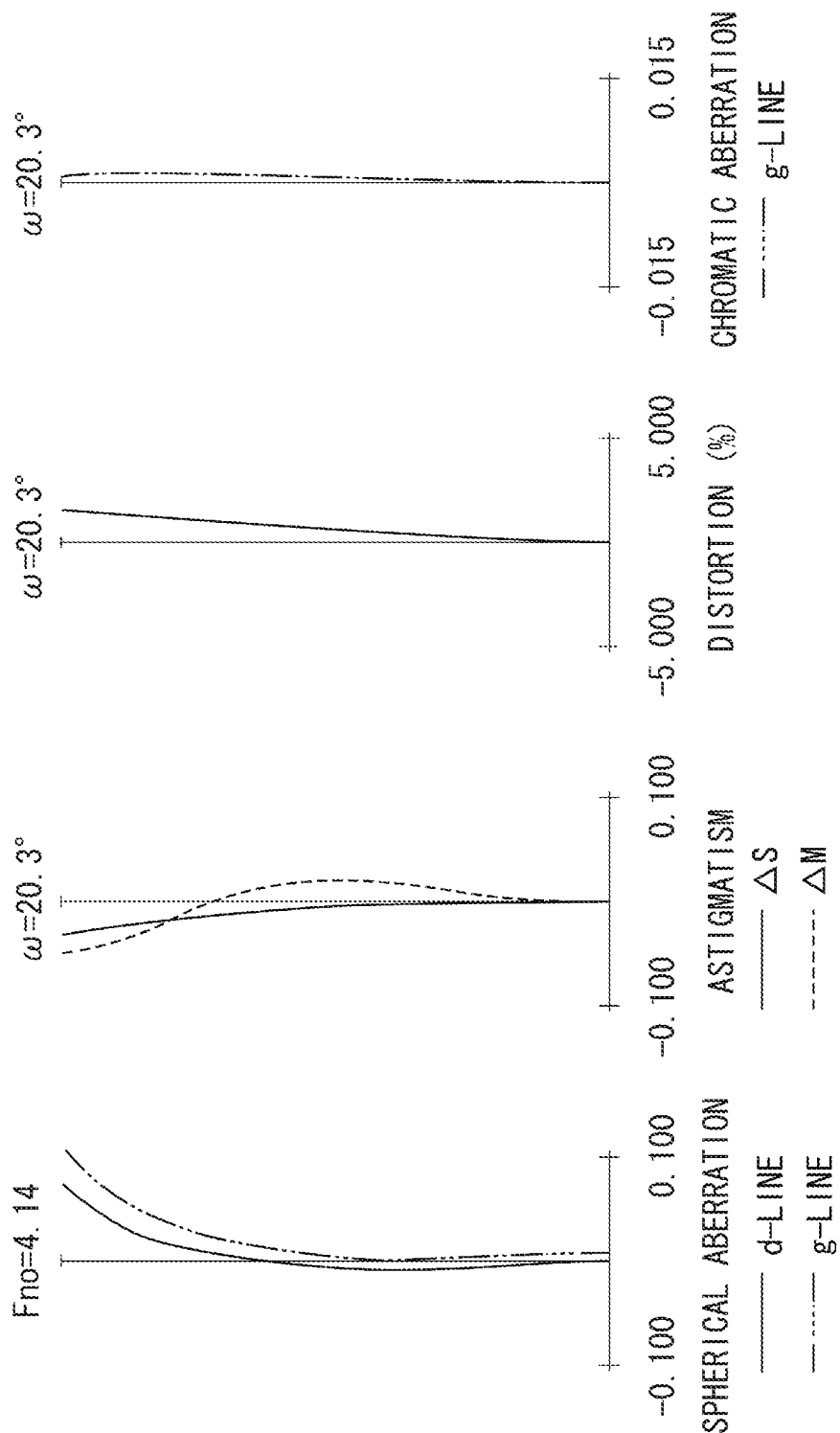
Figure 3:
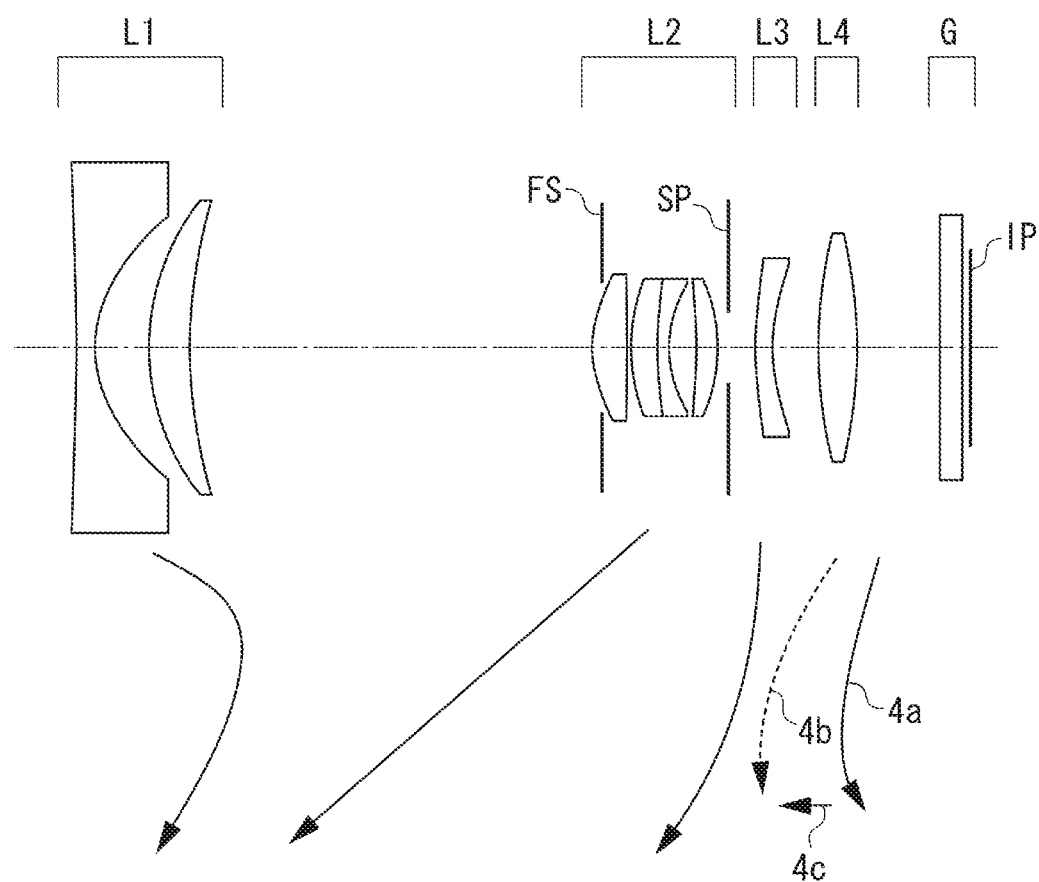
FIG. 3 is a lens cross-sectional view of a zoom lens according to a second exemplary embodiment at the wide-angle end.

FIG. 1 is a lens cross-sectional view of a zoom lens according to a first exemplary embodiment at a wide-angle end. FIGS. 2A, 2B, and 2C are aberration diagrams of the zoom lens according to the first exemplary embodiment at the wide-angle end, at a middle zoom position, and at a telephoto end, respectively. The zoom lens according to the first exemplary embodiment has a zoom ratio of 4.74 and an aperture ratio of about 2.60 to 6.06. FIG. 3 is a lens cross-sectional view of a zoom lens according to a second exemplary embodiment at a wide-angle end. FIGS. 4A, 4B, and 4C are aberration diagrams of the zoom lens according to the second exemplary embodiment at the wide-angle end, at a middle zoom position, and at a telephoto end, respectively. The zoom lens according to the second exemplary embodiment has a zoom ratio of 4.99 and an aperture ratio of about 2.88 to 6.06.

Figure 5:
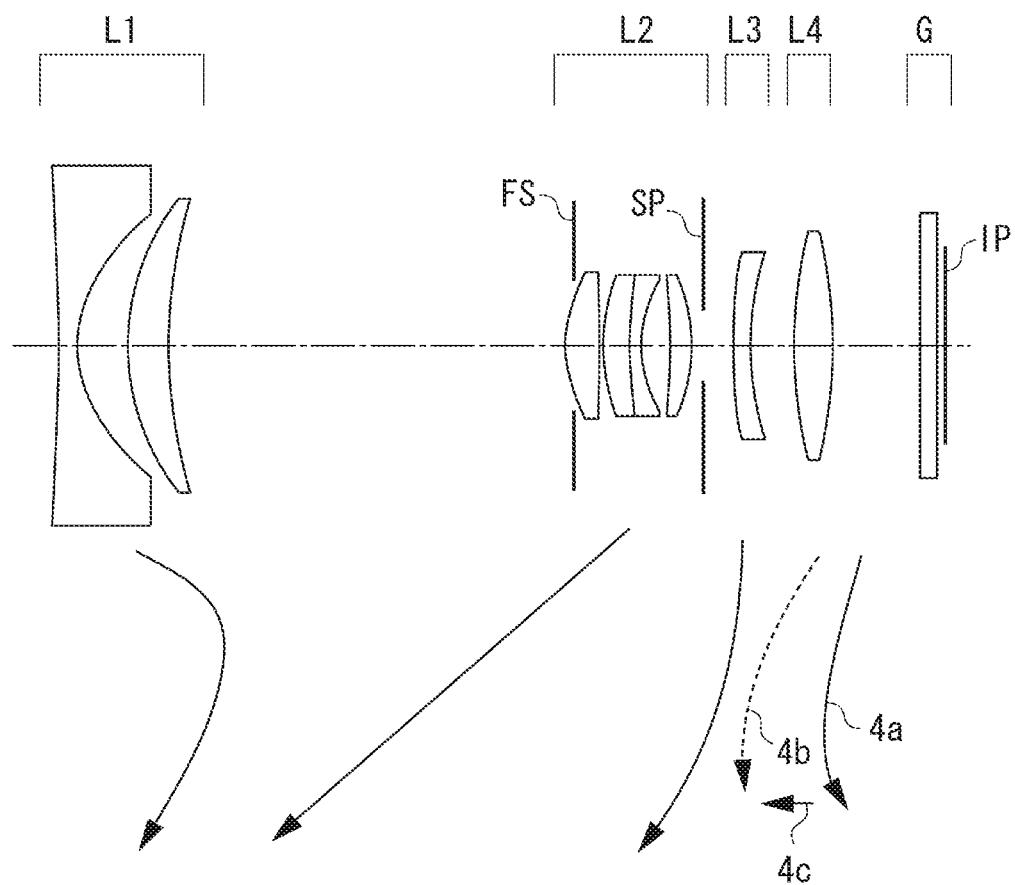
FIG. 5 is a lens cross-sectional view of a zoom lens according to a third exemplary embodiment at the wide-angle end.
Figure 6B:
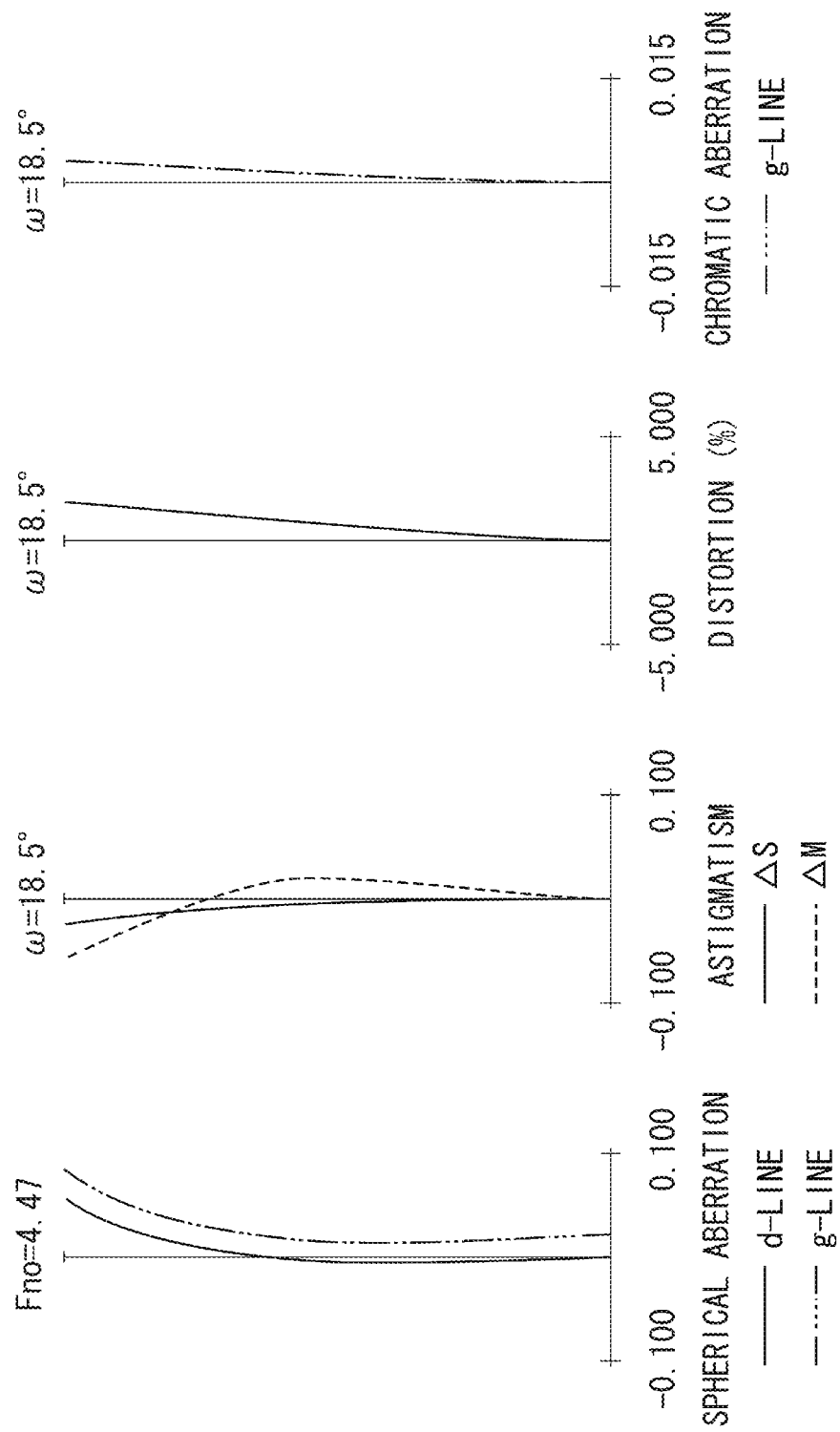
Figure 6C:
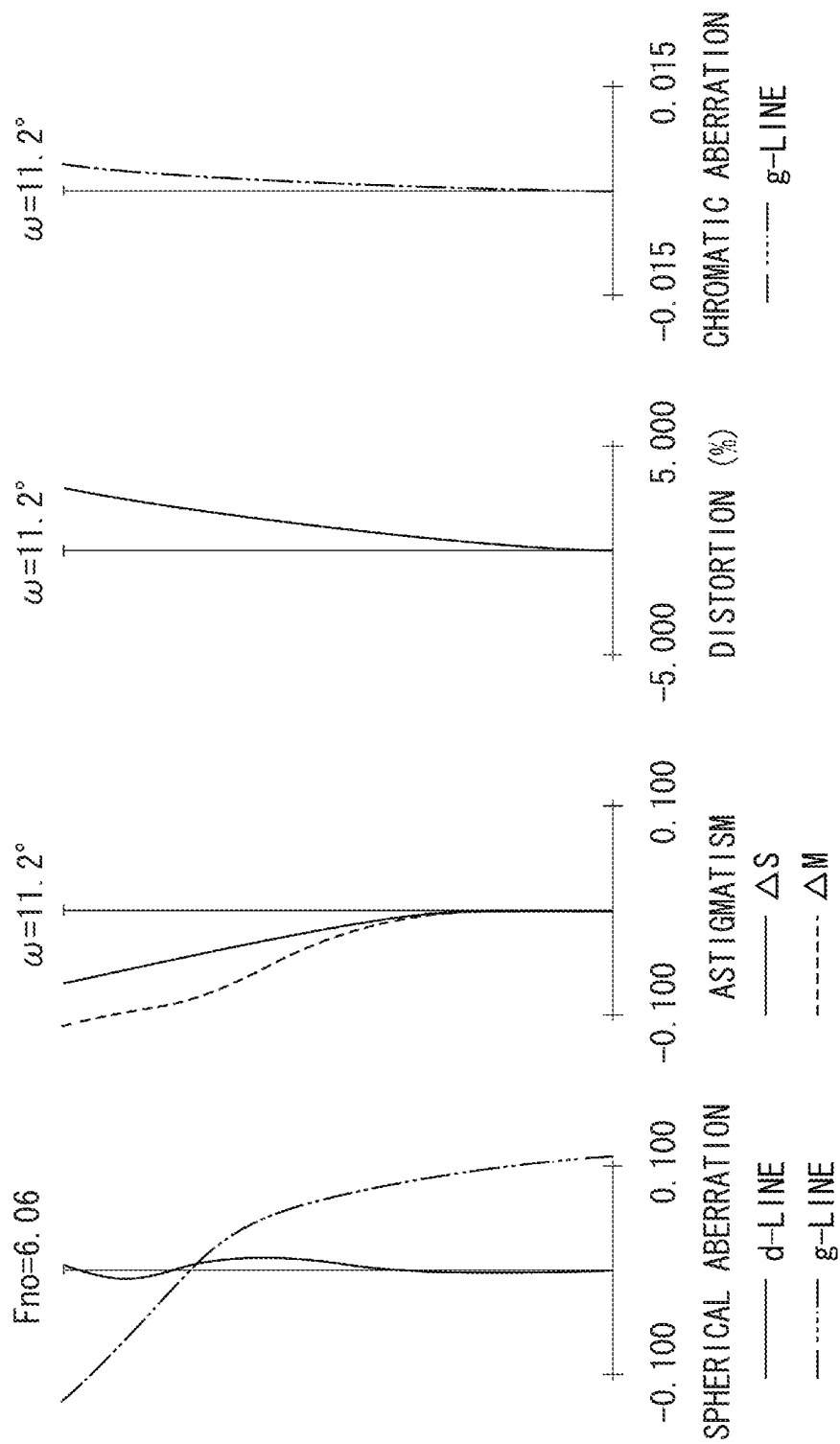
Figure 7:
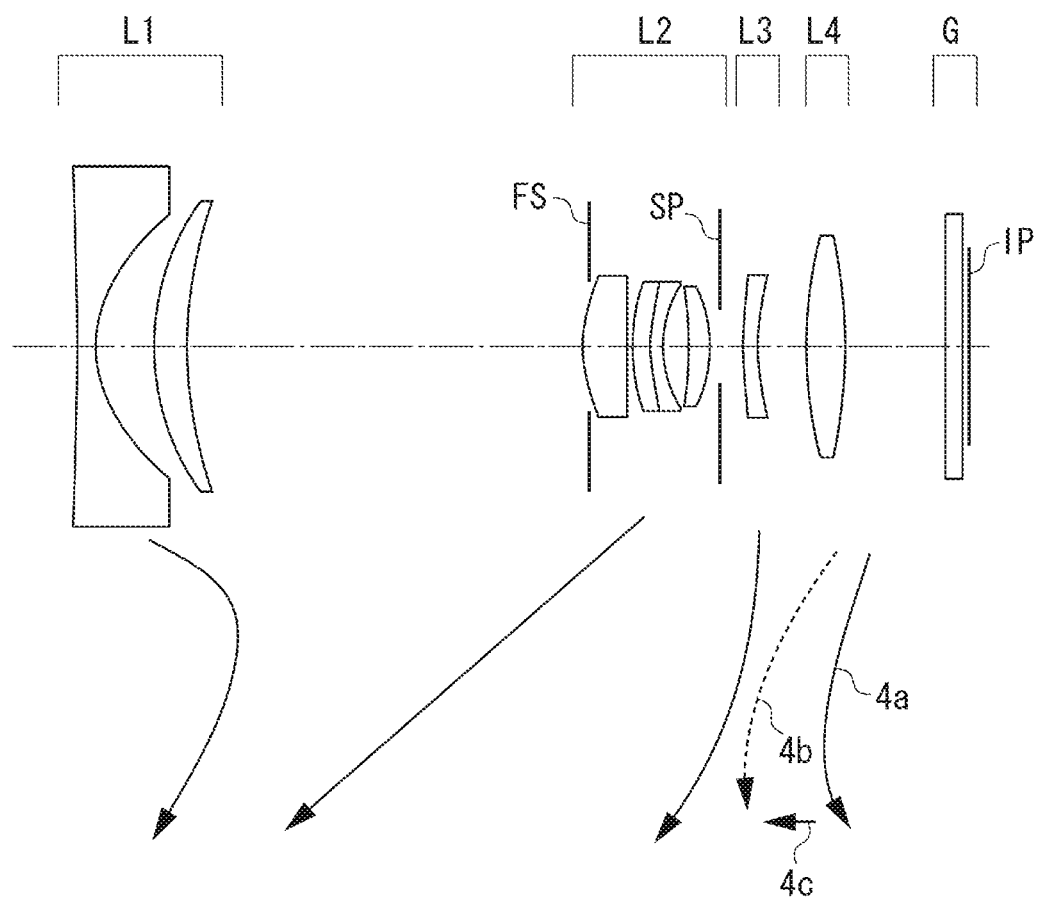
FIG. 7 is a lens cross-sectional view of a zoom lens according to a fourth exemplary embodiment at the wide-angle end.

FIG. 5 is a lens cross-sectional view of a zoom lens according to a third exemplary embodiment at a wide-angle end. FIGS. 6A, 6B, and 6C are aberration diagrams of the zoom lens according to the third exemplary embodiment at the wide-angle end, at a middle zoom position, and at a telephoto end, respectively. The zoom lens according to the third exemplary embodiment has a zoom ratio of 5.28 and an aperture ratio of about 2.88 to 6.06. FIG. 7 is a lens cross-sectional view of a zoom lens according to a fourth exemplary embodiment at a wide-angle end. FIGS. 8A, 8B, and 8C are aberration diagrams of the zoom lens according to the fourth exemplary embodiment at the wide-angle end, at a middle zoom position, and at a telephoto end, respectively. The zoom lens according to the fourth exemplary embodiment has a zoom ratio of 5.65 and an aperture ratio of about 2.88 to 6.08.

Figure 9:
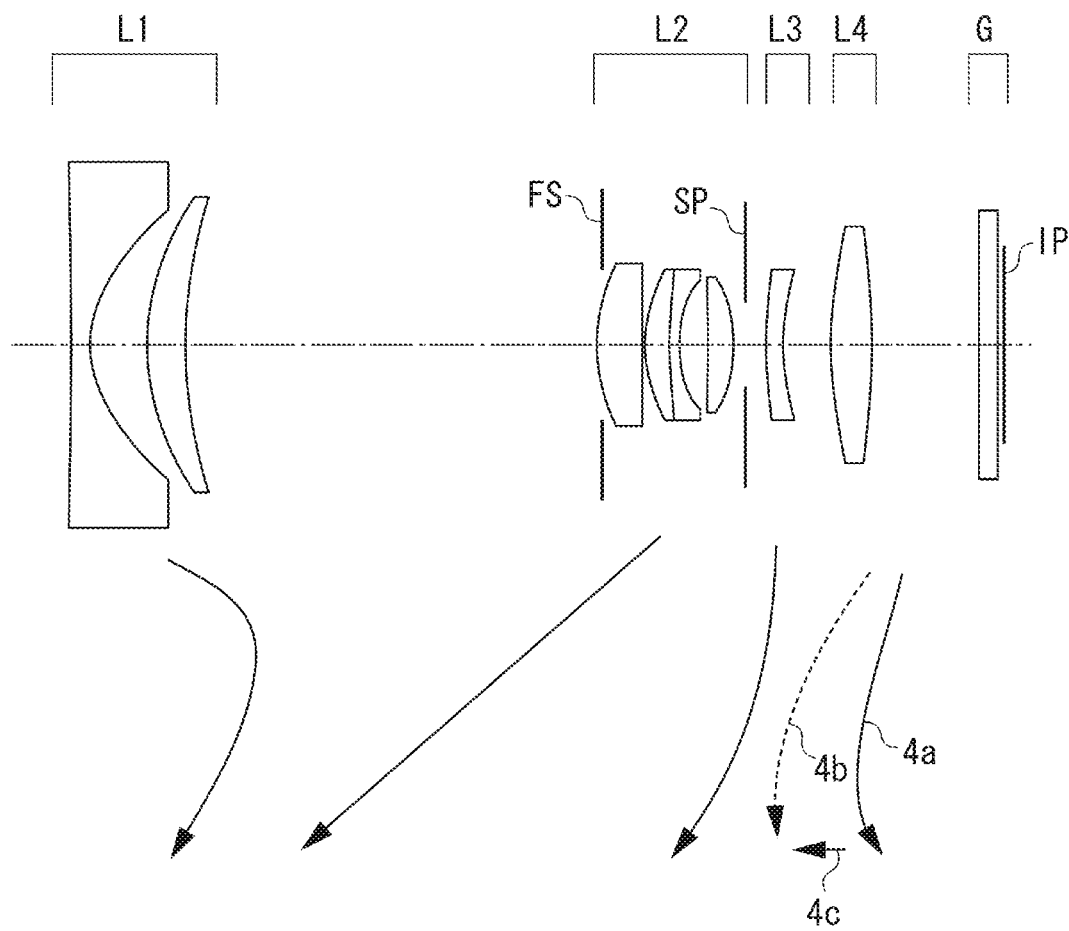
FIG. 9 is a lens cross-sectional view of a zoom lens according to a fifth exemplary embodiment at the wide-angle end.
Figure 10A:
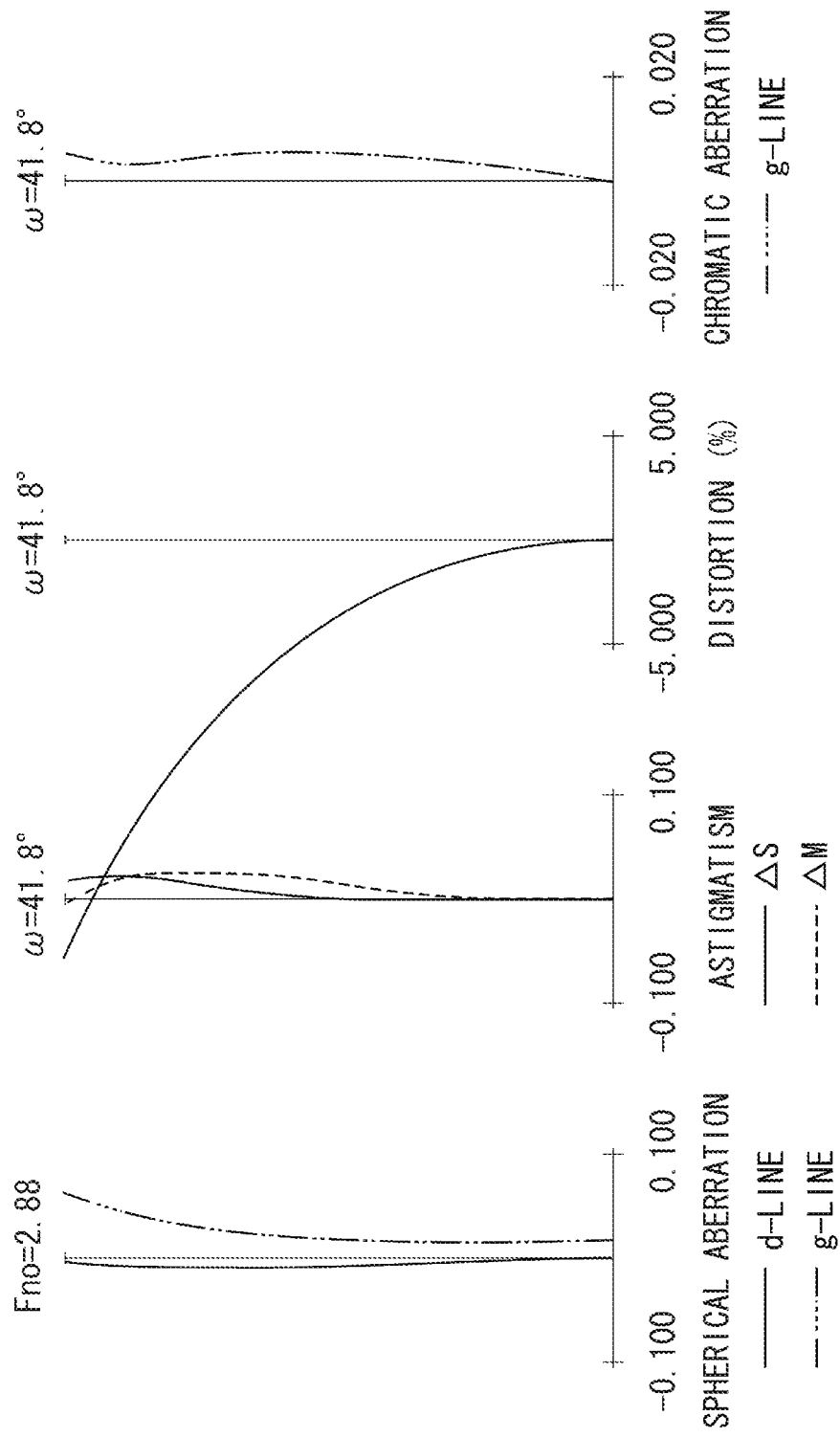
Figure 10B:
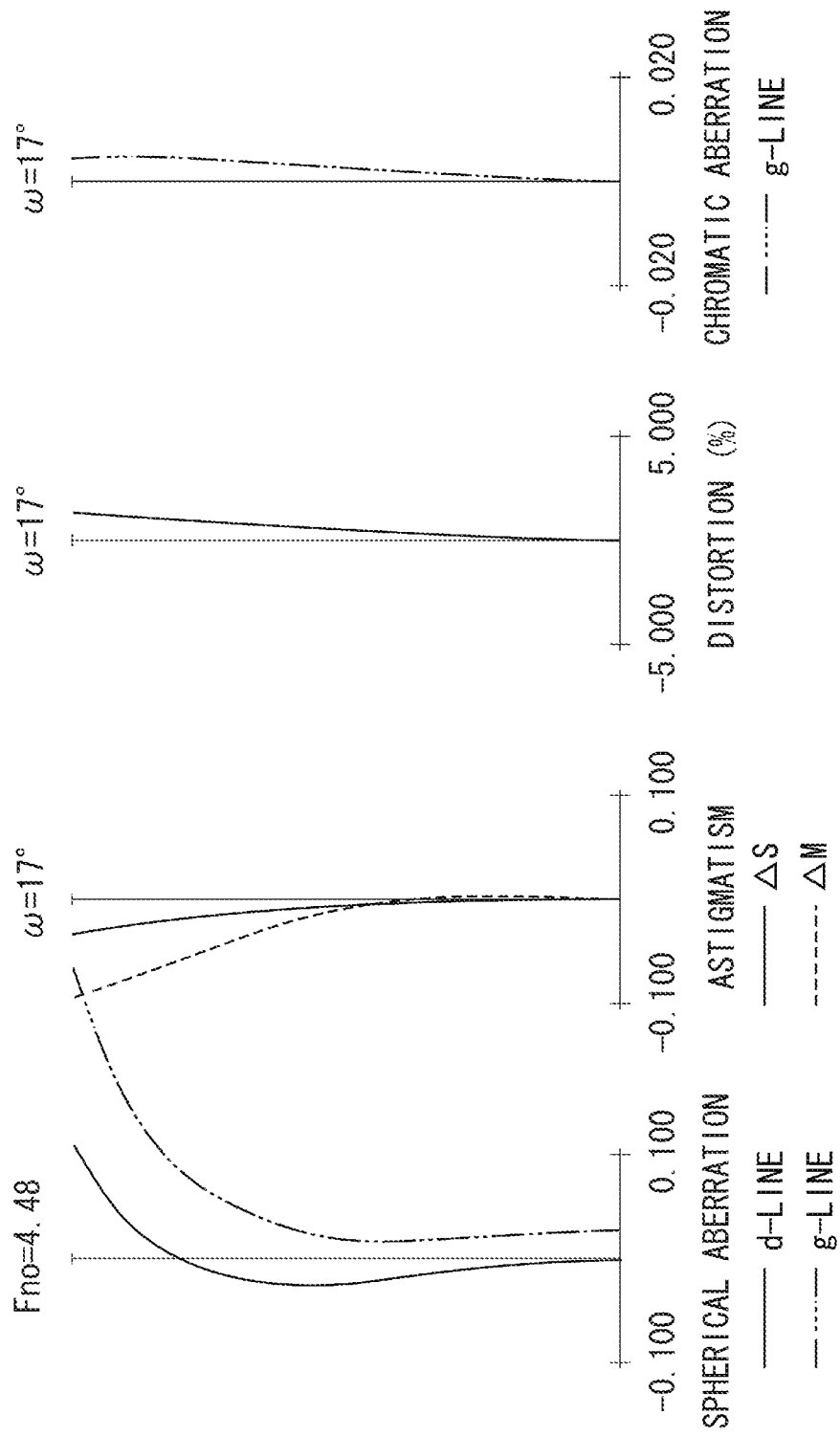

FIG. 9 is a lens cross-sectional view of a zoom lens according to a fifth exemplary embodiment at a wide-angle end. FIGS. 10A, 10B, and 10C are aberration diagrams of the zoom lens according to the fifth exemplary embodiment at the wide-angle end, at a middle zoom position, and at a telephoto end, respectively. The zoom lens according to the fifth exemplary embodiment has a zoom ratio of 6.12 and an aperture ratio of about 2.88 to 6.08.

Figure 11:
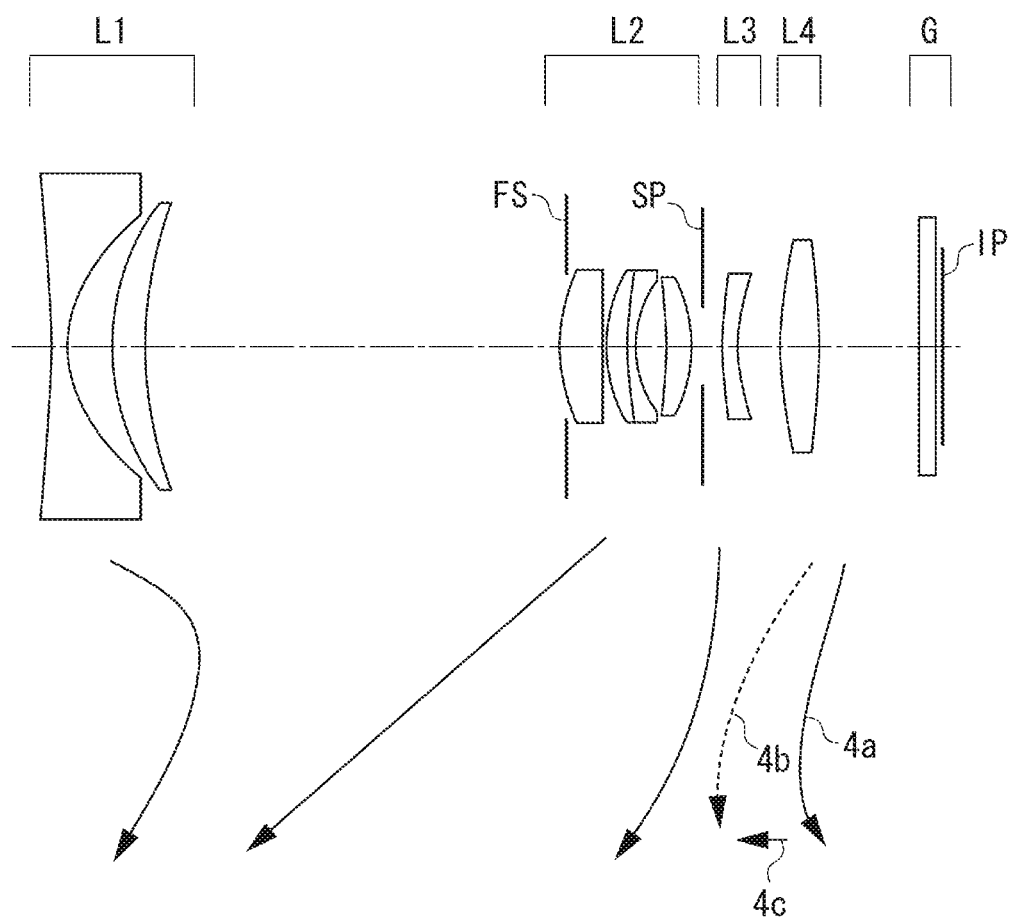
FIG. 11 is a lens cross-sectional view of a zoom lens according to a sixth exemplary embodiment at the wide-angle end.
Figure 12A:
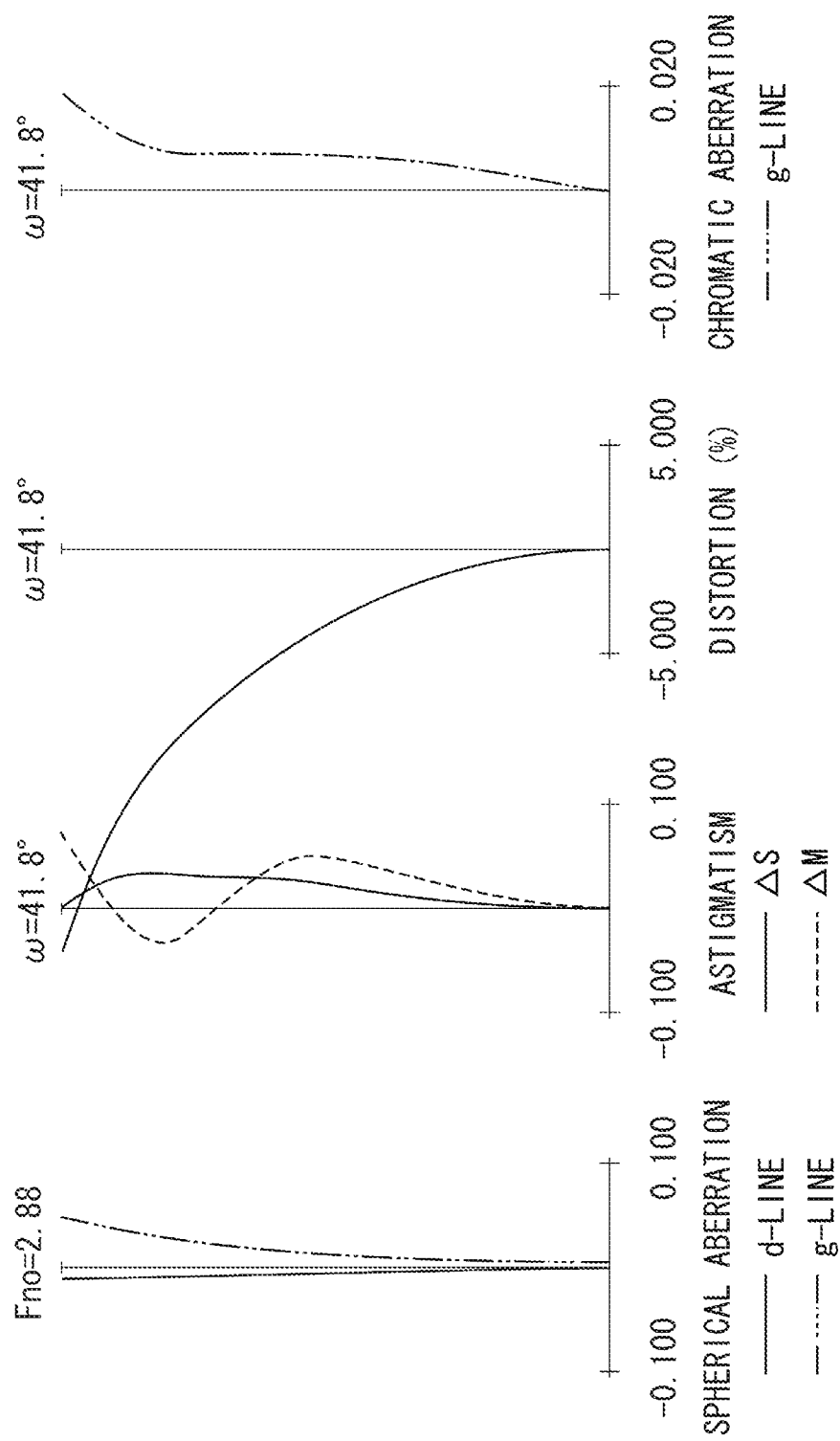
Figure 12C:
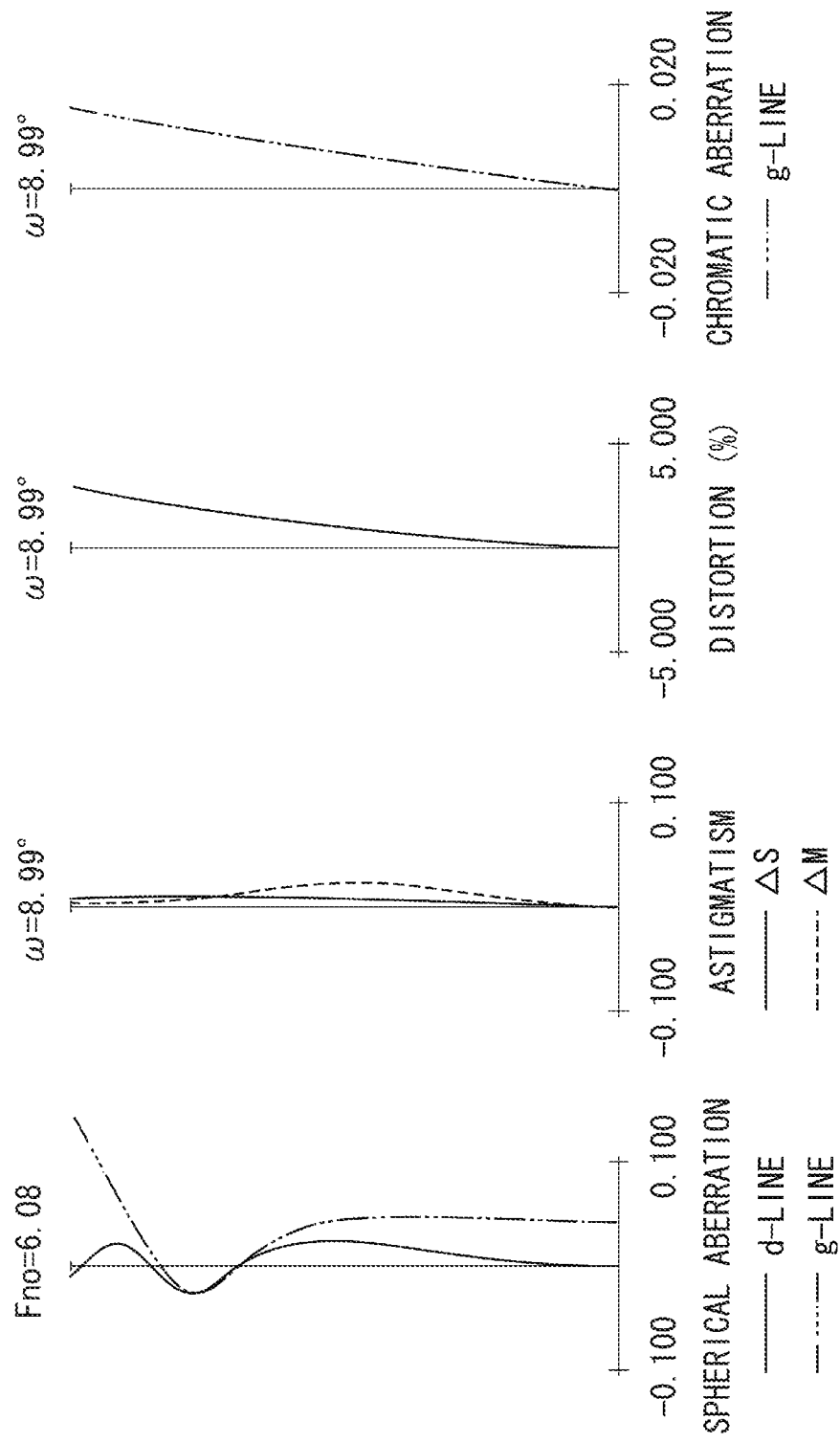

FIG. 11 is a lens cross-sectional view of a zoom lens according to a sixth exemplary embodiment at a wide-angle end. FIGS. 12A, 12B, and 12C are aberration diagrams of the zoom lens according to the sixth exemplary embodiment at the wide-angle end, at a middle zoom position, and at a telephoto end, respectively. The zoom lens according to the sixth exemplary embodiment has a zoom ratio of 6.64 and an aperture ratio of about 2.88 to 6.08.

Figure 13:
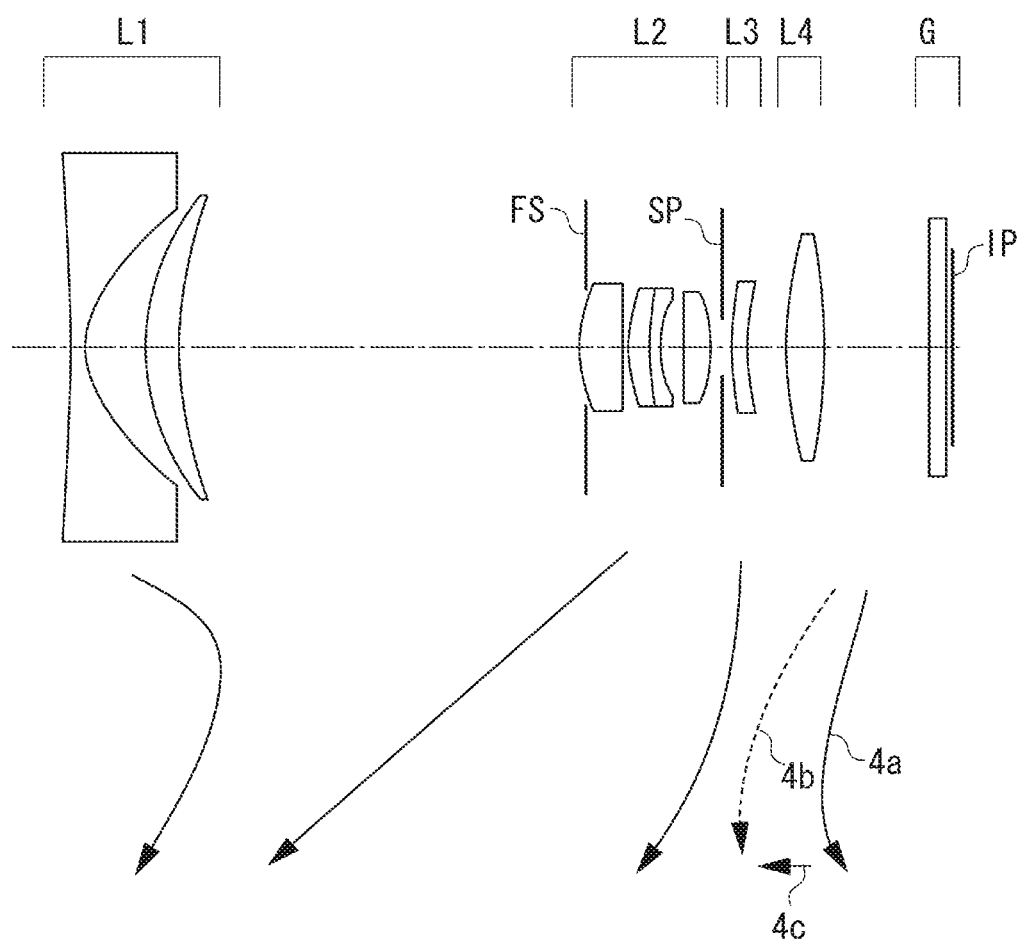
FIG. 13 is a lens cross-sectional view of a zoom lens according to a seventh exemplary embodiment at the wide-angle end.
Figure 14B:
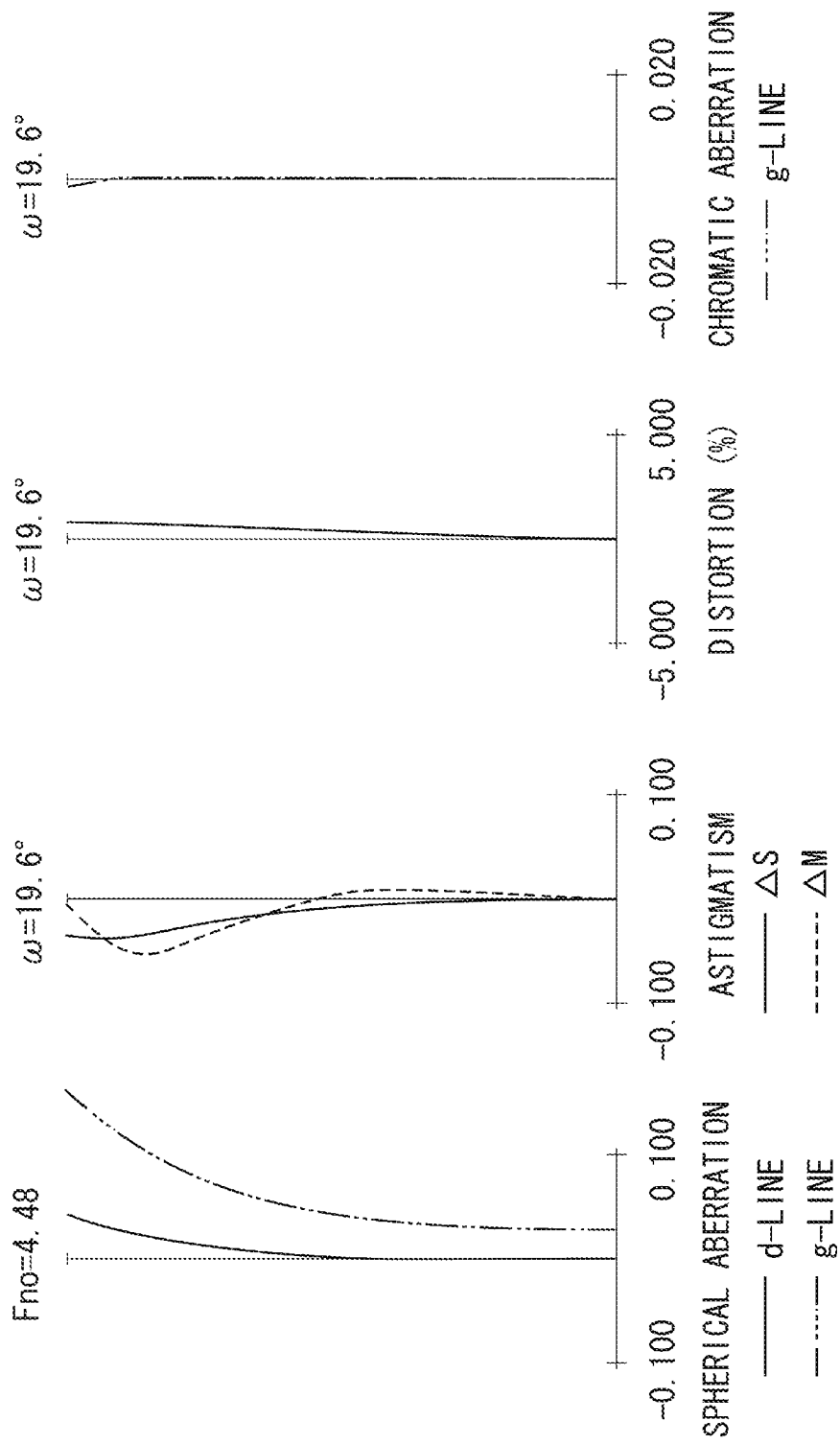

FIG. 13 is a lens cross-sectional view of a zoom lens according to a seventh exemplary embodiment at a wide-angle end. FIGS. 14A, 14B, and 14C are aberration diagrams of the zoom lens according to the seventh exemplary embodiment at the wide-angle end, at a middle zoom position, and at a telephoto end, respectively. The zoom lens according to the seventh exemplary embodiment has a zoom ratio of 5.69 and an aperture ratio of about 2.88 to 6.08.

Figure 15:
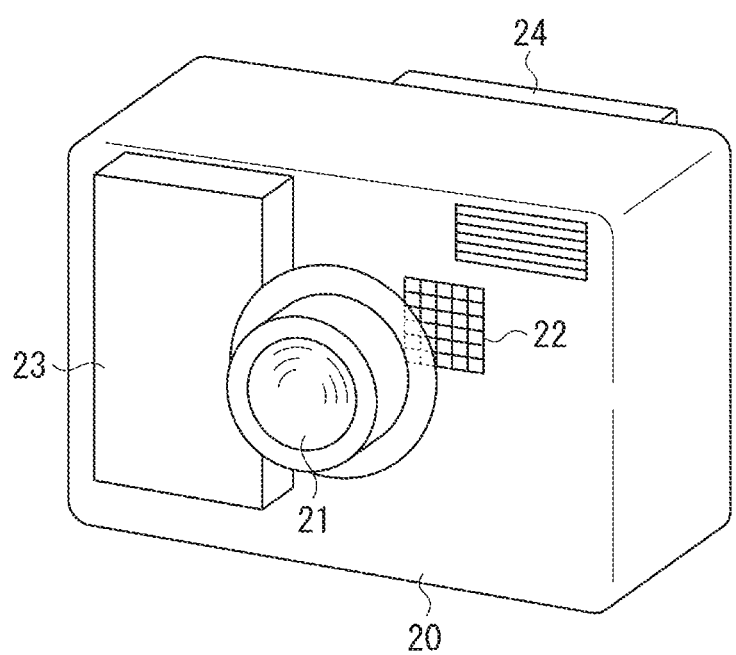
FIG. 15 is a schematic view of main components of an image pickup apparatus including a zoom lens according to an exemplary embodiment of the present invention.

FIG. 15 is a schematic view of main components of a digital still camera (image pickup apparatus) including a zoom lens according to an exemplary embodiment of the present invention. The zoom lens according to each exemplary embodiment is an image pickup lens system for use in an image pickup apparatus such as a video camera, a digital still camera, a silver-halide film camera, and a television camera. Note that the zoom lens according to each exemplary embodiment can be used as a projection optical system for a projection apparatus (projector) as well. In each lens cross-sectional view, the left side is the object side while the right side is the image side. Also, in each lens cross-sectional view, Li refers to an i-th lens unit where i is the order of a lens unit from the object side.

The zoom lens according to each exemplary embodiment includes, in order from the object side to the image side, a first lens unit L1 having negative refractive power, a second lens unit L2 having positive refractive power, a third lens unit L3 having negative refractive power, and a fourth lens unit L4 having positive refractive power. The zoom lens according to each exemplary embodiment is a negative lead type zoom lens having four lens units.

In each exemplary embodiment, an aperture stop SP is arranged between the second lens unit L2 and the third lens unit L3. An aperture diameter of the aperture stop SP can be constant or vary during zooming. By varying the diameter of the aperture stop SP, upper coma flare caused by an off-axis light flux significantly generated at the wide-angle end can be cut at a maximum, and more favorable optical performance can be obtained.

A mechanical stop (flare cut stop) FS whose aperture diameter is fixed is installed between the first lens unit L1 and the second lens unit L2. The mechanical stop FS can cut a ray that degrades optical performance. By setting the diameter of the mechanical stop FS to a maximum size that does not block an axial ray at the telephoto end, upper coma flare by an off-axis ray can be cut at a maximum in the entire zoom region.

An optical block G corresponds to an optical filter, a face plate, a low-pass filter, or an infrared cut filter, for example. An image plane IP corresponds to a solid-state image sensor such as a charge-coupled device (CCD) sensor and a complementary metal-oxide semiconductor (CMOS) sensor when the zoom lens is used as an imaging optical system for a video camera or a digital camera. The image plane IP corresponds to a film surface when the zoom lens is used as an imaging optical system for a silver-halide film camera. Arrows in each lens cross-sectional view represent movement loci of the respective lens units during zooming from the wide-angle end to the telephoto end.

In spherical aberration diagrams, Fno is an F-number. A solid line refers to the d-line (wavelength: 587.6 nm), and a two-dot chain line refers to the g-line (wavelength: 435.8 nm). In astigmatism diagrams, a solid line refers to sagittal image plane at the d-line, and a dashed line refers to a meridional plane at the d-line. A distortion diagram illustrates distortion at the d-line. In diagrams of chromatic aberration of magnification (lateral chromatic aberration), a two-dot chain line refers to the g-line. ω is an imaging half angle of view. Meanwhile, in each of the following exemplary embodiments, the wide-angle end and the telephoto end refer to respective zoom positions when the lens unit for zooming reaches the respective ends in an axial movable range under mechanical restrictions.

In each exemplary embodiment, the second lens unit L2 and the third lens unit L3 have a zooming function. The second lens unit L2 having positive refractive power and the third lens unit L3 having negative refractive power are in telephoto arrangements, which shorten a distance between the third lens unit L3 and the fourth lens unit L4 and achieves size reduction. In general, in a negative lead type zoom lens, the total lens length tends to be large by achievement of a high zoom ratio. However, by the telephoto arrangements, both the high zoom ratio and the size reduction are satisfied. Also, the third lens unit L3 moves along a locus different from that of the second lens unit L2 during zooming to widen a distance between the second lens unit L2 and the third lens unit L3. Further, by appropriately setting refractive power of the third lens unit L3, a zooming load of the third lens unit L3 increases while a zooming load of the second lens unit L2 decreases, and an amount of axial movement of the second lens unit L2 during zooming is reduced. Thus, the high zoom ratio is achieved while the total lens length at the telephoto end is shortened.

Meanwhile, in each exemplary embodiment, the third lens unit L3 may be moved in a direction having a component perpendicular to the optical axis to shift an image forming position of the zoom lens in the direction perpendicular to the optical axis. With this configuration, a shake of a photographed image can be corrected when the zoom lens is vibrated. Also, the entirety or part of the second lens unit L2 may be moved in a direction having a component perpendicular to the optical axis to correct a shake of a photographed image when the zoom lens is vibrated.

Also, in each exemplary embodiment, focusing is desirably performed by the fourth lens unit L4, which has a small number of lenses. Thus, a configuration of a lens barrel is miniaturized.

Focusing from an infinitely-distant object to a close object at the telephoto end is performed by moving forward the lens unit located closest to the image side as illustrated by an arrow 4c in the lens cross-sectional view. A curve 4a represents a movement locus to correct image plane variation caused by zooming from the wide-angle end to the telephoto end when an infinitely-distant object is focused. A curve 4b represents a movement locus to correct image plane variation caused by zooming from the wide-angle end to the telephoto end when a close object is focused.

In each exemplary embodiment, a focal length of the entire zoom lens at the wide-angle end is denoted by fw, a focal length of the entire zoom lens at the telephoto end is denoted by ft, a focal length of the third lens unit L3 is denoted by f3, a focal length of the fourth lens unit L4 is denoted by f4, and a sum of axial thicknesses of the first to fourth lens units (the sum of lens configuration lengths of the first to fourth lens units) is denoted by Tsum. Here, the axial thickness of each lens unit is an axial distance from a surface closest to the object side to a surface closest to the image side of each lens unit. Each exemplary embodiment satisfies the following conditions:

$$6.50 < |f3|/fw < 35.00 \quad (1)$$

$$0.78 < f4/ft < 5.00 \quad (2)$$

$$0.30 < Tsum/ft < 0.73 \quad (3)$$

Condition (1) specifies a ratio between the focal length f3 of the third lens unit L3 and the focal length fw of the entire zoom lens at the wide-angle end. When an absolute value |f3| of the focal length f3 of the third lens unit L3 becomes excessively large to the point that the upper limit of condition (1) is exceeded, the telephoto arrangements of the second lens unit L2 and the third lens unit L3 are weakened. Therefore, a situation where the upper limit of condition (1) is exceeded is not desirable because this effectively negates the desired effect of shortening the total lens length. When the absolute value |f3| of the focal length f3 of the third lens unit L3 becomes extremely small to the point that condition (1) becomes lower than the lower limit, aberration variation caused by zooming is significant, and favorable optical performance cannot be obtained. Accordingly, a situation where condition (1) is below its lower limit is not desirable.

Condition (2) is an expression specifying refractive power of the fourth lens unit L4. When the refractive power of the fourth lens unit L4 is weakened beyond the upper limit of condition (2), it is advantageous for aberration correction but is not favorable since an amount of movement of the third lens unit L3 becomes larger to achieve a desired zoom ratio, which causes enlargement of the optical system. When the refractive power of the fourth lens unit L4 is strengthened beyond the lower limit of condition (2), an amount of movement of the fourth lens unit L4 during zooming can be smaller, but it is not favorable since chromatic aberration of magnification at the telephoto end is larger, and favorable optical performance cannot be obtained.

Condition (3) specifies a ratio between the sum Tsum of axial thicknesses of the first to fourth lens units and the focal length ft of the entire zoom lens at the telephoto end. When the sum Tsum of axial thicknesses of the first to fourth lens units becomes larger than the upper limit of condition (3), size reduction cannot be achieved. When the focal length ft becomes larger than the lower limit of condition (3), aberration correction cannot be sufficiently performed in each lens unit, axial chromatic aberration at the telephoto end is especially larger, and favorable optical performance cannot be obtained.

In each exemplary embodiment, as described above, the respective elements are appropriately set to satisfy conditions (1), (2), and (3). Accordingly, a zoom lens that has a wide angle of view and a high zoom ratio, sufficiently corrects various aberrations such as axial chromatic aberration and chromatic aberration of magnification in the entire zoom range, and is small-sized in the axial direction can be obtained. Furthermore, for added precision, in each exemplary embodiment, the value ranges of conditions (1), (2), and (3) can be set as follows:

$$7.00 < |f3|/fw < 20.0 \quad (1a)$$

$$0.80 < f4/ft < 4.00 \quad (2a)$$

$$0.32 < T\text{sum}/ft < 0.72 \quad (3a)$$

Also, the value ranges of conditions (1), (2), and (3) can be set as follows:

$$7.50 < |f3|/fw < 15.00 \quad (1b)$$

$$0.82 < f4/ft < 2.00 \quad (2b)$$

$$0.34 < T\text{sum}/ft < 0.70 \quad (3b)$$

In addition, in each exemplary embodiment, it is desirable to satisfy one or more of the following (4) to (9) conditions, in addition to conditions (1) to (3). Here, an amount of movement of the second lens unit L2 during zooming from the wide-angle end to the telephoto end is denoted by M2, an amount of movement of the fourth lens unit L4 during zooming from the wide-angle end to the telephoto end is M4, and a refractive index of a positive lens having the highest refractive index at the d-line among positive lenses constituting the first lens unit L1 is denoted by Nd1max. Also, a focal length of the positive lens having the highest refractive index at the d-line among positive lenses constituting the first lens unit L1 is denoted by fNd1max. Further, a focal length of the first lens unit L1 is denoted by f1, a focal length of the second lens unit L2 is denoted by f2, a lateral magnification of the second lens unit L2 at the wide-angle end is denoted by β2w, and a lateral magnification of the second lens unit L2 at the telephoto end is denoted by β2t. Here, the amount of movement is an axial positional difference of each lens unit between at the wide-angle end and at the telephoto end, and a sign of the amount of movement is positive when each lens unit is located closer to the image side at the telephoto end than at the wide-angle end.

In this case, one or more of the following conditions can be satisfied:

$$-0.150 < M4/M2 < -0.010 \quad (4)$$

$$1.92 < Nd1\text{max} \quad (5)$$

$$1.50 < fNd1\text{max}/|f1| < 5.00 \quad (6)$$

$$0.50 < |f1|/f2 < 1.20 \quad (7)$$

$$0.30 < |f1|/ft < 0.70 \quad (8)$$

$$3.50 < \beta 2t/\beta 2w < 6.00 \quad (9)$$

Condition (4) specifies a ratio between the amount of axial movement M2 of the second lens unit L2 and the amount of axial movement M4 of the fourth lens unit L4. When the amount of movement M4 of the fourth lens unit L4 becomes smaller than the upper limit of condition (4), it is difficult to arrange the fourth lens unit L4 near the third lens unit L3 at the wide-angle end. Consequently, the number of lenses needs to be increased to obtain desired optical performance, which is not favorable. When the amount of movement M4 of the fourth lens unit L4 becomes larger than the lower limit of condition (4), the total lens length increases, which is not favorable.

Condition (5) specifies the refractive index of a positive lens having the highest refractive index at the d-line among positive lenses constituting the first lens unit L1. When the refractive index becomes smaller than the lower limit of condition (5), a radius of curvature of a lens surface is smaller while curvature of field at the wide-angle end and spherical aberration at the telephoto end are larger. Also, an edge thickness of the positive lens component is difficult to secure, and an axial thickness is larger, which cause an increase in size of the first lens unit L1 and inhibits size reduction of the image pickup apparatus. This is not favorable.

Condition (6) specifies a ratio between the focal length of the positive lens having the highest refractive index at the d-line among positive lenses constituting the first lens unit L1 and the focal length f1 of the first lens unit L1. When an absolute value |f1| of the focal length f1 of the first lens unit L1 becomes smaller than the upper limit of condition (6), the refractive power of the aforementioned positive lens is excessively weak, and an optical path length in the first lens unit L1 needs to be extended to correct aberrations. Consequently, the thickness of the first lens unit L1 becomes larger, and the total lens length is increased, which is not favorable. When the refractive power of the aforementioned positive lens becomes strong beyond the lower limit of condition (6), spherical aberration, coma, and astigmatism in the first lens unit L1 are excessively corrected, aberration variation during zooming is significant, and favorable optical performance cannot be obtained.

Condition (7) specifies a ratio between the focal length f1 of the first lens unit L1 and the focal length f2 of the second lens unit L2. When the absolute value |f1| of the focal length f1 of the first lens unit L1 becomes larger than the upper limit of condition (7), an amount of movement of the first lens unit L1 needs to be increased to correct image plane variation caused by zooming, which causes an increase in the total lens length. When the absolute value |f1| of the focal length f1 of the first lens unit L1 becomes smaller than the lower limit of condition (7), it is advantageous for size reduction and widening of an angle of view of the first lens unit L1 but is not favorable since the refractive power of the first lens unit L1 becomes too strong, and especially, correction of a coma becomes difficult.

Condition (8) specifies a ratio between the focal length ft of the entire zoom lens at the telephoto end and the focal length f1 of the first lens unit L1. When the absolute value |f1| of the focal length f1 of the first lens unit L1 becomes larger than the upper limit of condition (8), a distance of movement of the first lens unit L1 during zooming is extended, the total lens length is increased, and size reduction of the image pickup apparatus cannot be achieved. When the absolute value |f1| of the focal length f1 of the first lens unit L1 becomes smaller than the lower limit of condition (8), a negative Petzval sum in the first lens unit L1 becomes larger, curvature of field becomes larger, and it is difficult to correct curvature of field.

Condition (9) specifies changes of the lateral magnification of the second lens unit L2 during zooming. When the changes of the lateral magnification of the second lens unit L2 become larger than the upper limit of condition (9), the total lens length is increased since the amount of movement of the second lens unit L2 becomes larger when refractive power of the second lens unit L2 is constant. When the amount of movement of the second lens unit L2 is constant, the refractive power of the second lens unit L2 becomes too strong, and especially, correction of spherical aberration and coma at the telephoto end becomes difficult. When the changes of the lateral magnification of the second lens unit L2 become smaller than the lower limit of condition (9), the lateral magnification of the third lens unit L3 needs to be larger to obtain a desired zoom ratio. Thus, the amount of movement of the third lens unit L3 becomes larger, and the total lens length is increased.

Furthermore, the value ranges of conditions (4) to (9) can be set as follows:

$$-0.100 < M4/M2 < -0.015 \quad (4a)$$

$$1.94 < Nd1\max < 2.40 \quad (5a)$$

$$1.60 < fNd1\max/|f1| < 3.50 \quad (6a)$$

$$0.85 < |f1|/f2 < 1.10 \quad (7a)$$

$$0.32 < |f1|/ft < 0.65 \quad (8a)$$

$$3.70 < \beta 2t/\beta 2w < 5.70 \quad (9a)$$

Also, when the value ranges of conditions (4) to (9) are set as follows, effects of each condition can be obtained to a maximum extent.

$$-0.080 < M4/M2 < -0.020 \quad (4b)$$

$$1.98 < Nd1\max < 2.35 \quad (5b)$$

$$1.70 < fNd1\max/|f1| < 3.00 \quad (6b)$$

$$0.90 < |f1|/f2 < 1.05 \quad (7b)$$

$$0.35 < |f1|/ft < 0.60 \quad (8b)$$

$$3.80 < \beta 2t/\beta 2w < 5.50 \quad (9b)$$

In each exemplary embodiment, by setting the respective elements as above, a small-sized zoom lens that has a wide angle of view and a high zoom ratio and sufficiently corrects various aberrations such as axial chromatic aberration and chromatic aberration of magnification in the entire zoom range can be obtained. Also, effects of the present invention can be further enhanced by arbitrarily combining the aforementioned conditions.

Next, a lens configuration in each exemplary embodiment will be described. In the zoom lens in each exemplary embodiment, the first lens unit L1 includes two lenses, i.e., one negative lens and one positive lens in order from an object side to an image side. The second lens unit L2 includes four lenses, i.e., a positive lens, a cemented lens of a positive lens and a negative lens, and a positive lens. The third lens unit L3 includes one negative lens. The fourth lens unit L4 includes one positive lens. By configuring each lens unit as above, a zoom lens that reduces the number of lenses, is small-sized, and has high optical performance can be obtained.

Numerical examples 1 to 7 respectively corresponding to the first to seventh exemplary embodiments of the present invention are provided. In each numerical example, i represents the order of an optical surface from the object side to the image side, ri represents a radius of curvature of an i-th optical surface (i-th surface), di represents a distance along the optical axis between an i-th surface and an (i+1)-th surface, and ndi and vdi respectively represent a refractive index and an Abbe number of a material of an i-th optical member at the d-line.

For aspherical surfaces, k is an eccentricity coefficient (or conic constant), and A4, A6, A8, and A10 are aspheric coefficients of the corresponding order. An aspheric shape is expressed as $x=(h^2/R)/[1+\{1-(1+k)(h/R)^2\}^{1/2}]+A4h^4+A6h^6+A8h^8+A10h^{10}$, where x is an axial displacement from a surface vertex at a position corresponding to a height h from the optical axis, and R is a paraxial radius of curvature. In each numerical example, aspherical surfaces are denoted by an asterisk (*); and the last two surfaces closest to the image side are surfaces of an optical block such as a filter and a face plate. An aperture stop (iris stop) SP, and a glass block G such as a quartz low-pass filter and an infrared cut filter are illustrated. At an image plane IP, a photosensitive surface of a solid-state image sensor (photoelectric conversion element) such as a CCD sensor and a CMOS sensor is located. Correspondence to the aforementioned conditions in each numerical example is provided in Table 1.

NUMERICAL EXAMPLE 1

| Unit: mm | | | | | |
|---|---|---|---|---|---|
| Surface data | | | | | |
| Surface number | r | d | nd | vd | Effective diameter |
| 1* | −7342.774 | 0.70 | 1.85135 | 40.1 | 13.99 |
| 2* | 4.701 | 2.38 | | | 10.83 |
| 3 | 9.817 | 1.61 | 2.00272 | 19.3 | 11.19 |
| 4 | 20.577 | (variable) | | | 10.89 |
| 5 | ∞ | −0.30 | | | 4.59 |
| 6* | 6.018 | 1.33 | 1.83441 | 37.3 | 4.64 |
| 7* | −535.355 | 0.20 | | | 4.47 |
| 8 | 8.036 | 0.98 | 1.48749 | 70.2 | 4.30 |
| 9 | 22.798 | 0.40 | 1.92286 | 20.9 | 3.98 |
| 10 | 4.649 | 1.01 | | | 3.73 |
| 11 | −47.756 | 1.13 | 1.49700 | 81.6 | 3.79 |
| 12 | −6.296 | 0.50 | | | 3.87 |
| 13 (stop) | ∞ | (variable) | | | 3.73 |
| 14 | 18.641 | 0.70 | 1.55332 | 71.7 | 5.32 |
| 15* | 9.415 | (variable) | | | 5.42 |
| 16 | 33.595 | 1.58 | 1.69350 | 53.2 | 8.71 |
| 17* | −17.415 | (variable) | | | 8.80 |
| 18 | ∞ | 0.80 | 1.51633 | 64.1 | 10.00 |
| 19 | ∞ | 0.37 | | | 10.00 |
| Image plane | ∞ | | | | |

| Aspheric surface data |
|---|
| First surface |

K = −2.66164e+008  A4 = −1.38925e−004  A6 = 2.20083e−006
A8 = −2.71709e−008  A10 = 1.29429e−010

Second surface

K = −1.62092e+000  A4 = 8.27763e−004  A6 = −1.18601e−005
A8 = 2.09054e−007  A10 = −3.07898e−009

Sixth surface

K = −2.31028e−001  A4 = −2.08573e−004  A6 = −1.22490e−005
A8 = 1.34271e−006  A10 = −2.61622e−007

Seventh surface

K = 4.12069e+004  A4 = 4.93781e−004  A6 = −4.15150e−006
A8 = −1.66184e−006  A10 = 5.90758e−008

Fifteenth surface

K = 1.81266e−001  A4 = −1.34082e−005  A6 = −4.33900e−006
A8 = −8.67249e−008  A10 = 2.39791e−008

Seventeenth surface

K = −2.35402e+000  A4 = 2.14005e−004  A6 = −9.57932e−006
A8 = 2.40838e−007  A10 = −7.78100e−010

| Various data Zoom ratio 4.74 | | | |
|---|---|---|---|
| | Wide-angle | Middle | Telephoto |
| Focal length | 3.69 | 10.50 | 17.48 |
| F-number | 2.60 | 4.14 | 6.06 |
| Angle of view | 41.81 | 20.25 | 12.50 |
| Image height | 3.30 | 3.88 | 3.88 |
| Total lens length | 36.54 | 30.82 | 36.51 |
| BF (back focus) | 4.48 | 4.84 | 4.02 |
| d4 | 16.65 | 3.12 | 1.00 |

-continued

Unit: mm

| | | | |
|---|---|---|---|
| d13 | 1.16 | 7.31 | 8.99 |
| d15 | 1.75 | 3.07 | 10.01 |
| d17 | 3.58 | 3.93 | 3.11 |
| Entrance pupil position | 6.58 | 5.33 | 5.00 |
| Exit pupil position | −9.48 | −28.99 | 254.34 |
| Front-side principal point position | 8.88 | 12.07 | 23.68 |
| Rear-side principal point position | −3.32 | −10.13 | −17.11 |

Zoom lens unit data

| Unit | Start surface | Focal length | Lens configuration length | Front-side principal point position | Rear-side principal point position |
|---|---|---|---|---|---|
| 1 | 1 | −9.42 | 4.69 | −0.54 | −4.33 |
| 2 | 6 | 9.29 | 5.55 | −0.07 | −4.35 |
| 3 | 14 | −35.33 | 0.70 | 0.94 | 0.47 |
| 4 | 16 | 16.75 | 1.58 | 0.62 | −0.32 |

Single lens data

| Lens | Start surface | Focal length |
|---|---|---|
| 1 | 1 | −5.52 |
| 2 | 3 | 17.42 |
| 3 | 6 | 7.14 |
| 4 | 8 | 24.92 |
| 5 | 9 | −6.39 |
| 6 | 11 | 14.46 |
| 7 | 15 | −35.33 |
| 8 | 17 | 16.75 |

NUMERICAL EXAMPLE 2

Unit: mm

Surface data

| Surface number | r | d | nd | vd | Effective diameter |
|---|---|---|---|---|---|
| 1* | 7807.084 | 0.70 | 1.85135 | 40.1 | 14.05 |
| 2* | 4.673 | 2.37 | | | 10.93 |
| 3 | 10.081 | 1.72 | 2.00272 | 19.3 | 11.29 |
| 4 | 21.746 | (variable) | | | 10.96 |
| 5 | ∞ | −0.30 | | | 5.14 |
| 6* | 6.040 | 1.37 | 1.83441 | 37.3 | 5.34 |
| 7* | −392.818 | 0.20 | | | 5.26 |
| 8 | 8.660 | 1.10 | 1.49700 | 81.5 | 5.18 |
| 9 | 28.543 | 0.40 | 1.92286 | 20.9 | 4.94 |
| 10 | 4.683 | 1.15 | | | 4.69 |
| 11 | −39.858 | 0.94 | 1.58313 | 59.4 | 4.95 |
| 12* | −6.785 | 0.50 | | | 5.16 |
| 13 (stop) | ∞ | (variable) | | | 5.35 |
| 14 | 19.510 | 0.70 | 1.55332 | 71.7 | 6.74 |
| 15* | 10.124 | (variable) | | | 6.74 |
| 16 | 25.156 | 1.58 | 1.58313 | 59.4 | 8.64 |
| 17* | −17.162 | (variable) | | | 8.71 |
| 18 | ∞ | 0.80 | 1.51633 | 64.1 | 10.00 |
| 19 | ∞ | 0.37 | | | 10.00 |
| Image plane | ∞ | | | | |

Aspheric surface data

First surface

K = 7.24930e+005    A4 = −1.88665e−004    A6 = 2.73911e−006
A8 = −2.53090e−008    A10 = 9.06436e−011

-continued

Unit: mm

Second surface

K = −1.67520e+000    A4 = 8.08558e−004    A6 = −1.57124e−005
A8 = 3.07847e−007    A10 = −3.32322e−009

Sixth surface

K = −1.74492e−001    A4 = −2.32209e−004    A6 = −8.18348e−006
A8 = 2.12952e−006    A10 = −2.04114e−007

Seventh surface

K = 1.08410e+004    A4 = 5.10371e−004    A6 = −1.13661e−005
A8 = 3.35957e−006    A10 = −3.27356e−007

Twelfth surface

K = 2.51329e−003    A4 = −1.62065e−004    A6 = 1.08181e−005
A8 = −6.69360e−006    A10 = 6.63731e−007

Fifteenth surface

K = 6.55680e−001    A4 = −1.52420e−004    A6 = 1.25338e−005
A8 = −1.70536e−006    A10 = 8.11329e−008

Seventeenth surface

K = 9.38925e−001    A4 = 4.12324e−004    A6 = −1.82379e−005
A8 = 6.72135e−007    A10 = −9.42781e−009

Various data
Zoom ratio 4.99

| | Wide-angle | Middle | Telephoto |
|---|---|---|---|
| Focal length | 3.69 | 10.90 | 18.40 |
| F-number | 2.88 | 4.47 | 6.06 |
| Angle of view | 41.83 | 19.57 | 11.89 |
| Image height | 3.30 | 3.88 | 3.88 |
| Total lens length | 37.17 | 31.90 | 38.12 |
| BF | 4.39 | 4.62 | 4.00 |
| d4 | 17.04 | 3.27 | 1.00 |
| d13 | 1.13 | 7.25 | 9.35 |
| d15 | 1.91 | 4.06 | 11.07 |
| d17 | 3.49 | 3.71 | 3.10 |
| Entrance pupil position | 6.58 | 5.38 | 5.04 |
| Exit pupil position | −9.58 | −33.25 | 211.41 |
| Front-side principal point position | 8.90 | 12.74 | 25.05 |
| Rear-side principal point position | −3.31 | −10.53 | −18.03 |

Zoom lens unit data

| Unit | Start surface | Focal length | Lens configuration length | Front-side principal point position | Rear-side principal point position |
|---|---|---|---|---|---|
| 1 | 1 | −9.32 | 4.79 | −0.52 | −4.34 |
| 2 | 6 | 9.42 | 5.66 | −0.09 | −4.47 |
| 3 | 14 | −39.07 | 0.70 | 0.96 | 0.50 |
| 4 | 16 | 17.74 | 1.58 | 0.60 | −0.41 |

Single lens data

| Lens | Start surface | Focal length |
|---|---|---|
| 1 | 1 | −5.49 |
| 2 | 3 | 17.45 |
| 3 | 6 | 7.14 |
| 4 | 8 | 24.56 |
| 5 | 9 | −6.12 |
| 6 | 11 | 13.88 |
| 7 | 14 | −39.07 |
| 8 | 16 | 17.74 |

NUMERICAL EXAMPLE 3

Unit: mm

Surface data

| Surface number | r | d | nd | vd | Effective diameter |
|---|---|---|---|---|---|
| 1* | −349.186 | 0.70 | 1.85135 | 40.1 | 13.91 |
| 2* | 4.610 | 2.20 | | | 10.85 |
| 3 | 9.940 | 1.65 | 2.00272 | 19.3 | 11.19 |
| 4 | 22.506 | (variable) | | | 10.91 |
| 5 | ∞ | −0.30 | | | 5.45 |
| 6* | 6.052 | 1.32 | 1.83441 | 37.3 | 5.72 |
| 7* | −459.909 | 0.20 | | | 5.65 |
| 8 | 8.648 | 1.10 | 1.49700 | 81.5 | 5.53 |
| 9 | 26.607 | 0.40 | 1.92286 | 20.9 | 5.26 |
| 10 | 4.759 | 1.23 | | | 4.96 |
| 11 | −50.367 | 1.00 | 1.55332 | 71.7 | 5.24 |
| 12* | −6.834 | 0.50 | | | 5.44 |
| 13 (stop) | ∞ | (variable) | | | 5.62 |
| 14 | 22.181 | 0.70 | 1.55332 | 71.7 | 7.10 |
| 15* | 10.223 | (variable) | | | 7.09 |
| 16 | 22.546 | 1.58 | 1.58313 | 59.4 | 9.00 |
| 17* | −16.900 | (variable) | | | 9.03 |
| 18 | ∞ | 0.80 | 1.51633 | 64.1 | 10.00 |
| 19 | ∞ | 0.37 | | | 10.00 |
| Image plane | ∞ | | | | |

Aspheric surface data

First surface
K = 1.82917e+003   A4 = −1.74088e−004   A6 = 2.86070e−006
A8 = −3.25948e−008   A10 = 1.94661e−010

Second surface
K = −1.72657e+000   A4 = 8.86009e−004   A6 = −1.68380e−005
A8 = 2.55783e−007   A10 = −2.13899e−009

Sixth surface
K = −2.60020e−001   A4 = −1.95054e−004   A6 = −1.11712e−005
A8 = 3.00629e−006   A10 = −2.40089e−007

Seventh surface
K = −1.14375e+003   A4 = 4.08192e−004   A6 = −4.09463e−006
A8 = 2.16565e−006   A10 = −2.42695e−007

Twelfth surface
K = −2.77497e−001   A4 = −1.06955e−004   A6 = −1.56331e−005
A8 = 2.86732e−007   A10 = 1.45090e−007

Fifteenth surface
K = 1.58372e+000   A4 = −2.52075e−004   A6 = 8.16426e−006
A8 = −1.54820e−006   A10 = 6.99933e−008

Seventeenth surface
K = 2.47041e+000   A4 = 4.39509e−004   A6 = −1.64707e−005
A8 = 6.58136e−007   A10 = −1.05048e−008

Various data
Zoom ratio 5.28

| | Wide-angle | Middle | Telephoto |
|---|---|---|---|
| Focal length | 3.69 | 11.58 | 19.50 |
| F-number | 2.88 | 4.47 | 6.06 |
| Angle of view | 41.81 | 18.50 | 11.24 |
| Image height | 3.30 | 3.88 | 3.88 |
| Total lens length | 36.72 | 32.09 | 39.88 |
| BF | 4.48 | 5.03 | 4.00 |
| d4 | 16.75 | 2.73 | 1.14 |
| d13 | 1.08 | 8.55 | 8.85 |
| d15 | 1.86 | 3.22 | 13.34 |
| d17 | 3.58 | 4.13 | 3.10 |
| Entrance pupil position | 6.49 | 5.27 | 5.04 |
| Exit pupil position | −9.58 | −35.43 | 78.36 |
| Front-side principal point position | 8.81 | 13.10 | 29.42 |
| Rear-side principal point position | −3.32 | −11.20 | −19.13 |

Zoom lens unit data

| Unit | Start surface | Focal length | Lens configuration length | Front-side principal point position | Rear-side principal point position |
|---|---|---|---|---|---|
| 1 | 1 | −9.14 | 4.54 | −0.50 | −4.11 |
| 2 | 6 | 9.37 | 5.75 | 0.02 | −4.54 |
| 3 | 14 | −35.00 | 0.70 | 0.85 | 0.39 |
| 4 | 16 | 16.81 | 1.58 | 0.58 | −0.43 |

Single lens data

| Lens | Start surface | Focal length |
|---|---|---|
| 1 | 1 | −5.34 |
| 2 | 3 | 16.66 |
| 3 | 6 | 7.17 |
| 4 | 8 | 25.27 |
| 5 | 9 | −6.34 |
| 6 | 11 | 14.17 |
| 7 | 14 | −35.00 |
| 8 | 16 | 16.81 |

NUMERICAL EXAMPLE 4

Unit: mm

Surface data

| Surface number | r | d | nd | vd | Effective diameter |
|---|---|---|---|---|---|
| 1* | 1153.289 | 0.70 | 1.85135 | 40.1 | 13.87 |
| 2* | 4.688 | 2.44 | | | 10.73 |
| 3 | 10.163 | 1.40 | 2.14352 | 17.8 | 10.99 |
| 4 | 18.231 | (variable) | | | 10.68 |
| 5 | ∞ | −0.30 | | | 5.36 |
| 6* | 6.745 | 1.82 | 1.83441 | 37.3 | 5.45 |
| 7* | −631.314 | 0.20 | | | 5.24 |
| 8 | 7.195 | 0.89 | 1.49700 | 81.5 | 5.06 |
| 9 | 25.253 | 0.40 | 1.92286 | 20.9 | 4.83 |
| 10 | 4.940 | 1.02 | | | 4.51 |
| 11 | −26.424 | 0.91 | 1.55332 | 71.7 | 4.59 |
| 12* | −6.003 | 0.50 | | | 4.69 |
| 13 (stop) | ∞ | (variable) | | | 4.50 |
| 14 | 31.422 | 0.70 | 1.48749 | 70.2 | 5.37 |
| 15 | 11.445 | (variable) | | | 5.38 |
| 16 | 19.056 | 1.58 | 1.58313 | 59.4 | 8.64 |
| 17* | −27.458 | (variable) | | | 8.62 |
| 18 | ∞ | 0.80 | 1.51633 | 64.1 | 10.00 |
| 19 | ∞ | 0.15 | | | 10.00 |
| Image plane | ∞ | | | | |

Aspheric surface data

First surface
K = 2.08496e+004   A4 = −1.36872e−004   A6 = 3.58016e−006
A8 = −5.57912e−008   A10 = 2.37919e−010

Second surface
K = −1.74447e+000   A4 = 9.63363e−004   A6 = −1.28242e−005
A8 = 3.11214e−007   A10 = −6.95945e−009

Sixth surface
K = −2.52276e−001   A4 = −2.24130e−004   A6 = −1.53251e−005
A8 = 1.94828e−006   A10 = −2.43788e−007

-continued

Unit: mm

Seventh surface

| | | |
|---|---|---|
| K = 2.62215e+004 | A4 = 4.53235e−004 | A6 = −6.79749e−006 |
| A8 = 9.66736e−007 | A10 = −2.65055e−007 | |

Twelfth surface

| | | |
|---|---|---|
| K = 1.26999e−001 | A4 = −9.26091e−005 | A6 = −3.15778e−005 |
| A8 = 1.44876e−006 | A10 = −1.26044e−007 | |

Seventeenth surface

| | | |
|---|---|---|
| K = 1.24912e+001 | A4 = 3.41144e−004 | A6 = −1.25519e−005 |
| A8 = 6.48852e−007 | A10 = −1.20994e−008 | |

Various data
Zoom ratio 5.65

| | Wide-angle | Middle | Telephoto |
|---|---|---|---|
| Focal length | 3.69 | 12.04 | 20.85 |
| F-number | 2.88 | 4.48 | 6.08 |
| Angle of view | 41.81 | 17.84 | 10.53 |
| Image height | 3.30 | 3.88 | 3.88 |
| Total lens length | 36.81 | 32.16 | 40.01 |
| BF | 4.90 | 5.13 | 3.78 |
| d4 | 16.64 | 2.37 | 0.60 |
| d13 | 0.87 | 8.92 | 10.26 |
| d15 | 1.89 | 3.22 | 12.85 |
| d17 | 4.22 | 4.45 | 3.10 |
| Entrance pupil position | 6.44 | 5.09 | 4.80 |
| Exit pupil position | −9.73 | −30.98 | 210.11 |
| Front-side principal point position | 8.76 | 12.48 | 27.72 |
| Rear-side principal point position | −3.54 | −11.89 | −20.70 |

Zoom lens unit data

| Unit | Start surface | Focal length | Lens configuration length | Front-side principal point position | Rear-side principal point position |
|---|---|---|---|---|---|
| 1 | 1 | −9.11 | 4.54 | −0.46 | −4.13 |
| 2 | 6 | 9.30 | 5.74 | 0.19 | −4.16 |
| 3 | 14 | −37.36 | 0.70 | 0.75 | 0.27 |
| 4 | 16 | 19.53 | 1.58 | 0.41 | −0.60 |

Single lens data

| Lens | Start surface | Focal length |
|---|---|---|
| 1 | 1 | −5.53 |
| 2 | 3 | 18.38 |
| 3 | 6 | 8.01 |
| 4 | 8 | 19.92 |
| 5 | 9 | −6.72 |
| 6 | 11 | 13.82 |
| 7 | 14 | −37.36 |
| 8 | 16 | 19.53 |

NUMERICAL EXAMPLE 5

Unit: mm

Surface data

| Surface number | r | d | nd | vd | Effective diameter |
|---|---|---|---|---|---|
| 1* | −1009.011 | 0.70 | 1.85135 | 40.1 | 13.47 |
| 2* | 4.613 | 2.28 | | | 10.59 |
| 3 | 10.086 | 1.40 | 2.14352 | 17.8 | 10.86 |
| 4 | 18.318 | (variable) | | | 10.55 |
| 5 | ∞ | −0.30 | | | 5.77 |
| 6* | 6.727 | 1.82 | 1.83441 | 37.3 | 5.92 |
| 7* | −598.304 | 0.20 | | | 5.72 |
| 8 | 7.165 | 0.89 | 1.49700 | 81.5 | 5.51 |
| 9 | 24.074 | 0.40 | 1.92286 | 20.9 | 5.29 |
| 10 | 4.957 | 1.13 | | | 4.92 |
| 11 | −26.844 | 0.96 | 1.55332 | 71.7 | 5.01 |
| 12* | −5.990 | 0.50 | | | 5.12 |
| 13 (stop) | ∞ | (variable) | | | 4.90 |
| 14 | 33.937 | 0.70 | 1.48749 | 70.2 | 5.55 |
| 15 | 11.087 | (variable) | | | 5.53 |
| 16 | 19.516 | 1.58 | 1.58313 | 59.4 | 8.63 |
| 17* | −28.181 | (variable) | | | 8.62 |
| 18 | ∞ | 0.80 | 1.51633 | 64.1 | 10.00 |
| 19 | ∞ | 0.15 | | | 10.00 |
| Image plane | ∞ | | | | |

Aspheric surface data

First surface

| | | |
|---|---|---|
| K = 2.08496e+004 | A4 = −1.48263e−004 | A6 = 3.38776e−006 |
| A8 = −5.78204e−008 | A10 = 3.03175e−010 | |

Second surface

| | | |
|---|---|---|
| K = −1.72158e+000 | A4 = 9.21392e−004 | A6 = −1.50267e−005 |
| A8 = 3.16069e−007 | A10 = −7.24765e−009 | |

Sixth surface

| | | |
|---|---|---|
| K = −2.63330e−001 | A4 = −2.31390e−004 | A6 = −1.43472e−005 |
| A8 = 1.90977e−006 | A10 = −2.43012e−007 | |

Seventh surface

| | | |
|---|---|---|
| K = 2.62215e+004 | A4 = 4.46263e−004 | A6 = −6.27347e−006 |
| A8 = 1.18370e−006 | A10 = −2.65060e−007 | |

Twelfth surface

| | | |
|---|---|---|
| K = 1.03660e−001 | A4 = −1.00949e−004 | A6 = −2.14546e−005 |
| A8 = 4.67602e−007 | A10 = −1.22743e−007 | |

Seventeenth surface

| | | |
|---|---|---|
| K = 1.28187e+001 | A4 = 3.17859e−004 | A6 = −1.23295e−005 |
| A8 = 6.23264e−007 | A10 = −1.10328e−008 | |

Various data
Zoom ratio 6.12

| | Wide-angle | Middle | Telephoto |
|---|---|---|---|
| Focal length | 3.69 | 12.68 | 22.60 |
| F-number | 2.88 | 4.48 | 6.08 |
| Angle of view | 41.80 | 16.99 | 9.73 |
| Image height | 3.30 | 3.88 | 3.88 |
| Total lens length | 36.66 | 32.85 | 41.47 |
| BF | 4.98 | 5.18 | 3.76 |
| d4 | 16.49 | 2.30 | 0.54 |
| d13 | 0.85 | 9.43 | 11.78 |
| d15 | 1.81 | 3.42 | 12.87 |
| d17 | 4.31 | 4.50 | 3.08 |
| Entrance pupil position | 6.34 | 5.07 | 4.80 |
| Exit pupil position | −9.64 | −32.19 | 199.98 |
| Front-side principal point position | 8.64 | 12.78 | 29.95 |
| Rear-side principal point position | −3.54 | −12.53 | −22.45 |

Zoom lens unit data

| Unit | Start surface | Focal length | Lens configuration length | Front-side principal point position | Rear-side principal point position |
|---|---|---|---|---|---|
| 1 | 1 | −8.78 | 4.38 | −0.38 | −3.85 |
| 2 | 6 | 9.20 | 5.90 | 0.35 | −4.24 |

-continued

Unit: mm

| | | | | | |
|---|---|---|---|---|---|
| 3 | 14 | −34.12 | 0.70 | 0.71 | 0.23 |
| 4 | 16 | 20.02 | 1.58 | 0.41 | −0.60 |

Single lens data

| Lens | Start surface | Focal length |
|---|---|---|
| 1 | 1 | −5.39 |
| 2 | 3 | 18.00 |
| 3 | 6 | 7.98 |
| 4 | 8 | 20.17 |
| 5 | 9 | −6.83 |
| 6 | 11 | 13.71 |
| 7 | 14 | −34.12 |
| 8 | 16 | 20.02 |

NUMERICAL EXAMPLE 6

Unit: mm

Surface data

| Surface number | r | d | nd | vd | Effective diameter |
|---|---|---|---|---|---|
| 1* | −1015.039 | 0.70 | 1.85135 | 40.1 | 13.59 |
| 2* | 4.629 | 1.92 | | | 11.02 |
| 3 | 9.889 | 1.40 | 2.14352 | 17.8 | 11.26 |
| 4 | 18.478 | (variable) | | | 11.00 |
| 5 | ∞ | −0.30 | | | 5.98 |
| 6* | 6.700 | 1.82 | 1.83441 | 37.3 | 6.16 |
| 7* | −626.225 | 0.20 | | | 5.99 |
| 8 | 7.125 | 0.89 | 1.49700 | 81.5 | 5.77 |
| 9 | 22.737 | 0.40 | 1.92286 | 20.9 | 5.55 |
| 10 | 4.980 | 1.20 | | | 5.15 |
| 11 | −27.503 | 1.06 | 1.55332 | 71.7 | 5.25 |
| 12* | −5.989 | 0.50 | | | 5.39 |
| 13 (stop) | ∞ | (variable) | | | 5.14 |
| 14 | 39.108 | 0.70 | 1.48749 | 70.2 | 5.60 |
| 15 | 10.540 | (variable) | | | 5.58 |
| 16 | 20.962 | 1.58 | 1.58313 | 59.4 | 8.42 |
| 17* | −32.147 | (variable) | | | 8.42 |
| 18 | ∞ | 0.80 | 1.51633 | 64.1 | 10.00 |
| 19 | ∞ | 0.15 | | | 10.00 |
| Image plane | ∞ | | | | |

Aspheric surface data

First surface $K = 2.08496e+004$   $A4 = -2.05393e-004$   $A6 = 4.17290e-006$
$A8 = -5.54194e-008$   $A10 = 4.67122e-011$ Second surface $K = -1.68876e+000$   $A4 = 8.09243e-004$   $A6 = -1.63884e-005$
$A8 = 3.25982e-007$   $A10 = -6.99092e-009$ Sixth surface $K = -2.78645e-001$   $A4 = -2.45568e-004$   $A6 = -1.28484e-005$
$A8 = 1.89186e-006$   $A10 = -2.43697e-007$ Seventh surface $K = 2.62215e+004$   $A4 = 4.44292e-004$   $A6 = -7.14736e-006$
$A8 = 1.35959e-006$   $A10 = -2.64464e-007$ Twelfth surface $K = 1.06035e-001$   $A4 = -1.55777e-004$   $A6 = -1.73352e-005$
$A8 = 2.91267e-007$   $A10 = -1.21241e-007$ Seventeenth surface $K = 1.25668e+001$   $A4 = 3.01186e-004$   $A6 = -1.29691e-005$
$A8 = 5.37167e-007$   $A10 = -8.76865e-009$ Unit: mm Various data
Zoom ratio 6.64

| | Wide-angle | Middle | Telephoto |
|---|---|---|---|
| Focal length | 3.69 | 13.50 | 24.50 |
| F-number | 2.88 | 4.48 | 6.08 |
| Angle of view | 41.81 | 16.01 | 8.99 |
| Image height | 3.30 | 3.88 | 3.88 |
| Total lens length | 37.54 | 32.70 | 41.29 |
| BF | 4.97 | 5.19 | 3.77 |
| d4 | 17.73 | 2.43 | 0.55 |
| d13 | 0.83 | 9.61 | 13.02 |
| d15 | 1.68 | 3.13 | 11.61 |
| d17 | 4.29 | 4.52 | 3.09 |
| Entrance pupil position | 6.56 | 5.23 | 4.94 |
| Exit pupil position | −9.32 | −27.61 | −593.32 |
| Front-side principal point position | 8.81 | 12.17 | 28.43 |
| Rear-side principal point position | −3.54 | −13.35 | −24.35 |

Zoom lens unit data

| Unit | Start surface | Focal length | Lens configuration length | Front-side principal point position | Rear-side principal point position |
|---|---|---|---|---|---|
| 1 | 1 | −8.84 | 4.02 | −0.26 | −3.30 |
| 2 | 6 | 9.07 | 6.07 | 0.52 | −4.32 |
| 3 | 14 | −29.84 | 0.70 | 0.65 | 0.18 |
| 4 | 16 | 22.00 | 1.58 | 0.40 | −0.61 |

Single lens data

| Lens | Start surface | Focal length |
|---|---|---|
| 1 | 1 | −5.41 |
| 2 | 3 | 17.12 |
| 3 | 6 | 7.95 |
| 4 | 8 | 20.49 |
| 5 | 9 | −6.99 |
| 6 | 11 | 13.60 |
| 7 | 14 | −29.84 |
| 8 | 16 | 22.00 |

NUMERICAL EXAMPLE 7

Unit: mm

Surface data

| Surface number | r | d | nd | vd | Effective diameter |
|---|---|---|---|---|---|
| 1* | 1410.574 | 0.70 | 1.85135 | 40.1 | 15.18 |
| 2* | 4.550 | 2.47 | | | 11.58 |
| 3 | 10.222 | 1.40 | 2.14352 | 17.8 | 11.79 |
| 4 | 18.280 | (variable) | | | 11.53 |
| 5 | ∞ | −0.30 | | | 4.89 |
| 6* | 6.747 | 1.82 | 1.83441 | 37.3 | 4.94 |
| 7* | −742.861 | 0.20 | | | 4.75 |
| 8 | 7.177 | 0.89 | 1.49700 | 81.5 | 4.61 |
| 9 | 24.357 | 0.40 | 1.92286 | 20.9 | 4.38 |
| 10 | 4.941 | 1.02 | | | 4.13 |
| 11 | −27.497 | 1.04 | 1.55332 | 71.7 | 4.22 |
| 12* | −5.890 | 0.50 | | | 4.35 |
| 13 (stop) | ∞ | (variable) | | | 4.18 |
| 14 | 25.480 | 0.70 | 1.48749 | 70.2 | 5.30 |
| 15 | 11.353 | (variable) | | | 5.31 |
| 16 | 19.674 | 1.58 | 1.58313 | 59.4 | 8.70 |

-continued

Unit: mm

| | | | | | |
|---|---|---|---|---|---|
| 17* | −24.556 | (variable) | | | 8.70 |
| 18 | ∞ | 0.80 | 1.51633 | 64.1 | 10.00 |
| 19 | ∞ | 0.30 | | | 10.00 |
| Image plane | ∞ | | | | |

Aspheric surface data

First surface

K = 2.70449e+004   A4 = −1.29136e−004   A6 = 3.58661e−006
A8 = −5.50118e−008   A10 = 2.35504e−010

Second surface

K = −1.73888e+000   A4 = 9.66331e−004   A6 = −1.23088e−005
A8 = 3.04529e−007   A10 = −6.98689e−009

Sixth surface

K = −3.07844e−001   A4 = −2.47442e−004   A6 = −1.56660e−005
A8 = 2.11722e−006   A10 = −2.44666e−007

Seventh surface

K = 2.38260e+004   A4 = 4.60256e−004   A6 = −8.77407e−006
A8 = 1.21923e−006   A10 = −2.78154e−007

Twelfth surface

K = 1.53751e−001   A4 = −1.05950e−004   A6 = −3.53891e−005
A8 = 1.93720e−006   A10 = −1.32949e−007

Seventeenth surface

K = 1.24583e+001   A4 = 3.85588e−004   A6 = −1.35466e−005
A8 = 6.68126e−007   A10 = −9.48034e−009

Various data
Zoom ratio 5.69

| | Wide-angle | Middle | Telephoto |
|---|---|---|---|
| Focal length | 3.31 | 10.89 | 18.83 |
| F-number | 2.88 | 4.48 | 6.08 |
| Angle of view | 44.90 | 19.59 | 11.63 |
| Image height | 3.30 | 3.88 | 3.88 |
| Total lens length | 36.38 | 31.77 | 39.43 |
| BF | 5.05 | 5.27 | 4.18 |
| d4 | 16.71 | 2.52 | 0.59 |
| d13 | 0.37 | 7.63 | 9.41 |
| d15 | 1.57 | 3.68 | 12.58 |
| d17 | 4.23 | 4.44 | 3.35 |
| Entrance pupil position | 6.24 | 5.02 | 4.73 |
| Exit pupil position | −8.65 | −30.76 | 199.62 |
| Front-side principal point position | 8.33 | 12.09 | 25.34 |
| Rear-side principal point position | −3.01 | −10.59 | −18.53 |

Zoom lens unit data

| Unit | Start surface | Focal length | Lens configuration length | Front-side principal point position | Rear-side principal point position |
|---|---|---|---|---|---|
| 1 | 1 | −8.66 | 4.57 | −0.42 | −4.12 |
| 2 | 6 | 9.17 | 5.87 | 0.37 | −4.15 |
| 3 | 14 | −42.70 | 0.70 | 0.86 | 0.38 |
| 4 | 16 | 18.98 | 1.58 | 0.45 | −0.56 |

Single lens data

| Lens | Start surface | Focal length |
|---|---|---|
| 1 | 1 | −5.36 |
| 2 | 3 | 18.56 |
| 3 | 6 | 8.02 |
| 4 | 8 | 20.13 |
| 5 | 9 | −6.78 |

-continued

Unit: mm

| | | |
|---|---|---|
| 6 | 11 | 13.32 |
| 7 | 14 | −42.70 |
| 8 | 16 | 18.98 |

TABLE 1

| | Numerical Examples | | | |
|---|---|---|---|---|
| | 1 | 2 | 3 | 4 |
| $|f3|/fw$ | 9.57 | 10.59 | 9.49 | 10.12 |
| f4/ft | 0.96 | 0.96 | 0.86 | 0.94 |
| Tsum/ft | 0.69 | 0.66 | 0.62 | 0.58 |
| M4/M2 | −0.030 | −0.023 | −0.025 | −0.058 |
| Nd1max | 2.0027 | 2.0027 | 2.0027 | 2.1435 |
| $fNd1max/|f1|$ | 1.85 | 1.87 | 1.82 | 2.02 |
| $|f1|/f2$ | 1.01 | 0.99 | 0.98 | 0.98 |
| $|f1|/ft$ | 0.54 | 0.51 | 0.47 | 0.44 |
| $\beta 2t/\beta 2w$ | 3.92 | 4.13 | 4.11 | 4.42 |

| | Numerical Examples | | |
|---|---|---|---|
| | 5 | 6 | 7 |
| $|f3|/fw$ | 9.24 | 8.09 | 12.89 |
| f4/ft | 0.89 | 0.90 | 1.01 |
| Tsum/ft | 0.53 | 0.48 | 0.65 |
| M4/M2 | −0.059 | −0.057 | −0.046 |
| Nd1max | 2.1435 | 2.1435 | 2.1435 |
| $fNd1max/|f1|$ | 2.05 | 1.94 | 2.14 |
| $|f1|/f2$ | 0.95 | 0.97 | 0.95 |
| $|f1|/ft$ | 0.39 | 0.36 | 0.46 |
| $\beta 2t/\beta 2w$ | 4.71 | 5.17 | 4.55 |

The image pickup apparatus according to an exemplary embodiment of the present invention may have a circuit for electrically correcting distortion and/or chromatic aberration of magnification, as well as any of the above zoom lenses. Such a configuration allowing distortion or the like of the zoom lens reduces the number of lenses in the entire zoom lens and facilitates size reduction. Also, by electrically correcting chromatic aberration of magnification, bleeding in a photographed image is alleviated, and resolution is easily improved.

Next, an exemplary embodiment of a digital still camera using the zoom lens according to an exemplary embodiment of the present invention as a photographic optical system will be described with reference to FIG. 15. In FIG. 15, the digital still camera includes a camera body 20, a photographic optical system 21 including any of the zoom lenses described in the first to seventh exemplary embodiments, a solid-state image sensor 22 (photoelectric conversion element) such as a CCD sensor or a CMOS sensor incorporated in the camera body 20 and receiving an object image formed by the photographic optical system 21, a memory 23 for storing information corresponding to the object image photoelectrically converted by the solid-state image sensor 22, and a viewfinder 24 including a liquid crystal display panel and used to observe the object image formed on the solid-state image sensor 22. By applying the zoom lens according to an exemplary embodiment of the present invention to the image pickup apparatus such as the digital still camera, an image pickup apparatus that is small-sized and has high optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165634 filed Jul. 26, 2012, which is hereby incorporated by reference herein in its entirety.

What is claimed is:

1. A zoom lens comprising, in order from an object side to an image side:
    a first lens unit having negative refractive power;
    a second lens unit having positive refractive power;
    a third lens unit having negative refractive power; and
    a fourth lens unit having positive refractive power,
    wherein each lens unit moves during zooming so that a distance between the first lens unit and the second lens unit at a telephoto end is shorter than that at a wide-angle end, and a distance between the second lens unit and the third lens unit and a distance between the third lens unit and the fourth lens unit at the telephoto end are larger than those at the wide-angle end, and
    when a focal length of the third lens unit is denoted by f3, a focal length of the fourth lens unit is denoted by f4, a focal length of the entire zoom lens at the wide-angle end is denoted by fw, a focal length of the entire zoom lens at the telephoto end is denoted by ft, and a sum of thicknesses of the first to fourth lens units along an optical axis of the zoom lens is denoted by Tsum, the following conditions are satisfied:

$6.50 < |f3|/fw < 35.00$ $0.78 < f4/ft < 5.00$ $0.30 < Tsum/ft < 0.73$.

2. The zoom lens according to claim 1, wherein, when an amount of movement of the second lens unit during zooming from the wide-angle end to the telephoto end is denoted by M2, and an amount of movement of the fourth lens unit during zooming from the wide-angle end to the telephoto end is denoted by M4, the following condition is satisfied:

$-0.150 < M4/M2 < -0.010$.

3. The zoom lens according to claim 1, wherein, when a refractive index of a positive lens having the highest refractive index for d-line among positive lenses constituting the first lens unit is denoted by Nd1max, the following condition is satisfied:

$1.92 < Nd1max$.

4. The zoom lens according to claim 1, wherein, when a focal length of a positive lens having the highest refractive index for d-line among positive lenses constituting the first lens unit is denoted by fNd1max, and a focal length of the first lens unit is denoted by f1, the following condition is satisfied:

$1.50 < fNd1max/|f1| < 5.00$.

5. The zoom lens according to claim 1, wherein, when a focal length of the first lens unit is denoted by f1, and a focal length of the second lens unit is denoted by f2, the following condition is satisfied:

$0.50 < |f1|/f2 < 1.20$.

6. The zoom lens according to claim 1, wherein, when a focal length of the first lens unit is denoted by f1, the following condition is satisfied:

$0.30 < |f1|/ft < 0.70$.

7. The zoom lens according to claim 1, wherein, when a lateral magnification of the second lens unit at the wide-angle end is denoted by β2w, and a lateral magnification of the second lens unit at the telephoto end is denoted by β2t, the following condition is satisfied:

$3.50 < β2t/β2w < 6.00$.

8. The zoom lens according to claim 1, wherein the first lens unit includes at least one positive lens and at least one negative lens.

9. The zoom lens according to claim 1, wherein, during focusing from an infinitely-distant object to a nearby object, the fourth lens unit moves toward the object side.

10. The zoom lens according to claim 1, wherein the second lens unit or the third lens unit is moved so as to have a component thereof perpendicular to the optical axis to shift an image forming position of the zoom lens in a direction perpendicular to the optical axis.

11. An image pickup apparatus comprising:
    a zoom lens; and
    an image sensor configured to receive an image formed by the zoom lens,
    wherein the zoom lens includes, in order from an object side to an image side, a first lens unit having negative refractive power, a second lens unit having positive refractive power, a third lens unit having negative refractive power, and a fourth lens unit having positive refractive power,
    wherein each lens unit moves during zooming so that a distance between the first lens unit and the second lens unit at a telephoto end is shorter than that at a wide-angle end, and a distance between the second lens unit and the third lens unit and a distance between the third lens unit and the fourth lens unit at the telephoto end are larger than those at the wide-angle end, and
    when a focal length of the third lens unit is denoted by f3, a focal length of the fourth lens unit is denoted by f4, a focal length of the entire zoom lens at the wide-angle end is denoted by fw, a focal length of the entire zoom lens at the telephoto end is denoted by ft, and a sum of thicknesses of the first to fourth lens units along an optical axis of the zoom lens is denoted by Tsum, the following conditions are satisfied:

$6.50 < |f3|/fw < 35.00$ $0.78 < f4/ft < 5.00$ $0.30 < Tsum/ft < 0.73$.

\* \* \* \* \*